United States Patent
Ivanov et al.

(10) Patent No.: US 11,899,040 B2
(45) Date of Patent: Feb. 13, 2024

(54) ESTIMATION OF SPEED OF A VEHICLE BASED ON LIGHT INTENSITY MEASUREMENTS

(71) Applicant: HERE GLOBAL B.V., Eindhoven (NL)

(72) Inventors: Pavel Ivanov, Tampere (FI); Henri Jaakko Julius Nurminen, Tampere (FI); Lauri Aarne Johannes Wirola, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 474 days.

(21) Appl. No.: 17/065,031

(22) Filed: Oct. 7, 2020

(65) Prior Publication Data

US 2021/0102968 A1 Apr. 8, 2021

(30) Foreign Application Priority Data

Oct. 8, 2019 (EP) .................................... 19202077

(51) Int. Cl.
*G01P 3/36* (2006.01)
*G01S 19/48* (2010.01)

(52) U.S. Cl.
CPC .............. *G01P 3/36* (2013.01); *G01S 19/485* (2020.05)

(58) Field of Classification Search
None
See application file for complete search history.

(56) References Cited

U.S. PATENT DOCUMENTS

| 6,272,443 | B1* | 8/2001 | Motzko ............... B60W 40/068 |
| | | | 702/143 |
| 9,086,481 | B1 | 7/2015 | Dowdall et al. |
| 9,102,265 | B2 | 8/2015 | Ehlgen et al. |
| 2011/0156925 | A1 | 6/2011 | Lee et al. |
| 2017/0127495 | A1 | 5/2017 | Mohan et al. |
| 2018/0148116 | A1 | 5/2018 | Kurata |
| 2018/0167140 | A1 | 6/2018 | Brandt-Pearce et al. |

(Continued)

FOREIGN PATENT DOCUMENTS

| CN | 106908779 A * | 6/2017 | ............... G01S 5/16 |
| EP | 2199806 A1 * | 6/2010 | ............... G01P 3/36 |

(Continued)

OTHER PUBLICATIONS

Chenani, S. et al., "Target Detection Distances Under Different Road Lighting Intensities", University of Toronto, dated (Sep. 22, 2016).

(Continued)

*Primary Examiner* — Mark Hellner
(74) *Attorney, Agent, or Firm* — Jason Wejnert; HERE GLOBAL B.V.

(57) ABSTRACT

A method is provided that is performed by at least one first apparatus with the method including obtaining or causing obtaining information indicative of a variation in intensity of light emitted from at least two light sources positioned along a segment of a road; and obtaining or causing obtaining information indicative of a velocity of the at least one first apparatus based at least on the information indicative of the variation in intensity. A corresponding apparatus is also provided.

18 Claims, 5 Drawing Sheets

(56) References Cited

U.S. PATENT DOCUMENTS

2019/0041419 A1* 2/2019 Abuella .................... G01P 3/36

FOREIGN PATENT DOCUMENTS

EP 2944973 A2 11/2015
JP 5262817 B2 * 8/2013 ............... G08G 1/08

OTHER PUBLICATIONS

Daoust, T. et al., "Light at the End of the Tunnel: High-Speed Lidar-based Train Localization in Challenging Underground Environments", Institute for Aerospace Studies, dated (2016).
Extended European Search Report for Application No. 19202077.4 dated Apr. 15, 2020.

* cited by examiner

ESTIMATION OF SPEED OF A VEHICLE BASED ON LIGHT INTENSITY MEASUREMENTS

CROSS-REFERENCE TO RELATED APPLICATION

This application claims priority to European Application No. 19202077.4, filed Oct. 8, 2019, the entire contents of which are incorporated herein by reference.

FIELD OF THE DISCLOSURE

The invention generally relates to the field of positioning and navigation, more specifically to the field of estimating velocity e.g. of vehicles using mobile devices. The invention specifically relates to an estimation of a velocity based on a variation in intensity of light emitted from light sources positioned along a road segment.

BACKGROUND

Positioning systems e.g. for positioning of vehicles often rely on global navigation satellite systems (GNSS) using GNSS signals received e.g. from four GNSS satellites for determining a position of a vehicle. Such positioning systems may be incorporated in devices installed in a vehicle and/or may be implemented as software in mobile devices.

Such positioning systems being dependent on reception of GNSS satellites, precision of positioning solutions obtained therewith may depend on a visibility of corresponding GNSS satellites. For example, when a vehicle enters a tunnel, the vehicle may lose connection to GNSS satellites. To cope with such situations, existing solutions employ inertial sensors such as for example gyroscopes and accelerometers to further estimate the vehicle trajectory.

While such solutions may already help to bridge road segments where GNSS signal reception is poor or unavailable (e.g. road segments inside of tunnels), precision of corresponding measurements is limited by the existing inertial sensors. In particular in case of inertial sensors incorporated in mobile devices such as smartphones, limits of such sensors may lead to considerable errors in positioning e.g. of a vehicle.

SUMMARY OF SOME EMBODIMENTS OF THE INVENTION

It is inter-alia an object of the present invention to improve accuracy of positioning technologies, in particular for positioning of vehicles, by improving accuracy of positioning in regions where reception e.g. of GNSS signals is poor or unavailable. It is a further object of the invention to provide a method that enables continuing navigation in case e.g. connection to a GNSS system is poor or unavailable and that does not rely (at least exclusively) on inertia sensors.

According to a first exemplary aspect of the invention, a method is disclosed, said method comprising:
 obtaining or causing obtaining information indicative of a variation in intensity of light emitted from at least two light sources positioned along a segment of a road;
 obtaining or causing obtaining information indicative of a velocity of at least one first apparatus and/or of at least one further entity based at least on the information indicative of the variation in intensity.

According to a second exemplary aspect of the invention, a method performed by at least one first apparatus is disclosed, said method comprising:
 obtaining or causing obtaining information indicative of a variation in intensity of light emitted from at least two light sources positioned along a segment of a road;
 obtaining or causing obtaining information indicative of a mutual distance between the at least two light sources;
 providing or causing providing the information indicative of the mutual distance to be accessible by at least one external apparatus.

According to a third exemplary aspect of the invention, a method performed by at least one second apparatus is disclosed, said method comprising:
 receiving or causing receiving information indicative of a mutual distance between at least two light sources positioned along at least one respective road segment;
 holding or causing holding available the information indicative of the mutual distance;
 providing or causing providing the information indicative of the mutual distance to be accessible by at least one external apparatus.

For each of the methods according to the first, second and third aspects of the invention, an apparatus is furthermore disclosed (and subsequently referred to as apparatus according to the first, second or third aspect of the invention) that is configured to perform and/or control the respective method or comprises respective means for performing and/or controlling the steps of the respective method. In this case, it is possible either for all the steps of the respective method to be controlled, or for all the steps of the respective method to be performed, or for one or more steps to be controlled and one or more steps to be performed. One or more of the means can also be performed and/or controlled by the same unit. By way of example, one or more of the means may be formed by one or more processors.

For each of the methods according to the first, second and third aspects of the invention, an apparatus (e.g. the at least one first apparatus according to the first aspect or the at least one first apparatus according to the second aspect or the at least one second apparatus according to the third aspect) is furthermore disclosed (and subsequently referred to as at least one first apparatus according to the first or second aspect, as at least one second apparatus according to the third aspect of the invention) that comprises at least one processor and at least one memory that contains program code, wherein the memory and the program code are configured to use the at least one processor to cause an apparatus (for example the apparatus having the processor and the memory) to perform and/or control at least the respective method. In this case, it is possible either for all the steps of the respective method to be controlled, or for all the steps of the respective method to be performed, or for one or more steps to be controlled and one or more steps to be performed.

The at least one first apparatus according to the first or second aspect of the invention may correspond to at least one mobile device (also referred to as smart device), for example, such as e.g. an Internet-of-Things (IoT) device, a smart home device, a smartphone, a tablet computer, a notebook computer, a smart watch, or a smart band. The at least one first apparatus according to the first or second aspect of the invention may generally further correspond to a navigation device installed in a vehicle, e.g. in a car or motorcycle. The at least one second apparatus according to the third aspect of the invention may correspond to at least one network entity such as at least one server (e.g. a server cloud). The at least one second apparatus according to the third aspect of the invention may be integrated in the back end of a positioning service providing company, for example.

For each of the methods according to the first, second and third aspects of the invention, a system is furthermore disclosed (and subsequently referred to a system according to the first, second or third aspect of the invention) that comprises at least one apparatus (e.g. the at least one first apparatus according to the first and/or second aspect or the at least one second apparatus according to the third aspect) that is configured to perform and/or control the respective method or has means for performing and/or controlling the steps of the respective method. In this case, it is possible either for all the steps of the respective method to be controlled, or for all the steps of the respective method to be performed, or for one or more steps to be controlled and one or more steps to be performed.

Further, a system is disclosed that comprises at least one first apparatus according to the first and/or second aspect of the invention and at least one second apparatus according to the third aspect of the invention.

In other words, a system is disclosed that may comprise:
at least one first apparatus configured for:
obtaining or causing obtaining information indicative of a variation in intensity of light emitted from at least two light sources positioned along a segment of a road;
obtaining or causing obtaining information indicative of a velocity of the at least one first apparatus based at least on the information indicative of the variation in intensity;
and/or at least one first apparatus configured for:
obtaining or causing obtaining information indicative of a mutual distance between the at least two light sources;
providing or causing providing the information indicative of the mutual distance to be accessible by at least one second apparatus;
and
at least one second apparatus configured for:
accessing or causing accessing the information indicative of the mutual distance between the at least two light sources;
holding or causing holding available the information indicative of the mutual distance between the at least two light sources;
providing or causing providing the information indicative of the mutual distance to be accessible by at least one first apparatus.

For each of the methods according to the first, second and third aspects of the invention, a computer program is furthermore disclosed (and subsequently referred to as computer program according to the first, second or third aspect of the invention) that comprises program instructions that cause a processor to perform and/or control the respective method when the computer program runs on the processor. In this specification, a processor is intended to be understood to mean control units, microprocessors, microcontrol units such as microcontrollers, digital signal processors (DSP), application-specific integrated circuits (ASICs) or field programmable gate arrays (FPGAs), inter alia.

In this case, it is possible either for all the steps of the respective method to be controlled, or for all the steps of the respective method to be performed, or for one or more steps to be controlled and one or more steps to be performed. By way of example, the computer program may be distributable via a network such as the internet, a telephone or mobile radio network and/or a local area network, for example. The computer program may at least in part be software and/or firmware of a processor. It may equally be implemented at least in part as hardware. By way of example, the computer program may be stored on a computer-readable storage medium, e.g. a magnetic, electric, electromagnetic, optical and/or other kind of storage medium. By way of example, the storage medium may be part of the processor, for example a (nonvolatile or volatile) program memory of the processor or a part thereof. By way of example, the storage medium is substantive, that is to say tangible, and/or non-transitory.

Exemplary embodiments of all aspects of the present invention may have one or more (or for instance all) of the properties described below.

In an exemplary embodiment, the method according to the first aspect performed by at least one first apparatus. Thereby, the at least one apparatus may correspond to or be adapted for a mobile device such as an Internet-of-Things (IoT) device, a smart home device, a smartphone, a tablet computer, a notebook computer, a smart watch, and/or a smart band. In this case, the at least one first apparatus according to the first or second aspect may in an exemplary embodiment be configured to detect or cause detecting an intensity of light emitted from the at least two light sources as a function of time and/or space using a dedicated light sensor and/or a camera of (installed at and/or comprised by) the at least one first apparatus and may thus obtain information indicative of a variation of the intensity based on the detected intensity.

Obtaining information indicative of the velocity, the velocity of the at least one first apparatus, e.g. of the mobile device and at the same time a velocity of at least one further entity may be obtained, e.g. of a vehicle in which the mobile device is carried. For example, a mobile device may be carried in a vehicle such as a car being removably mounted e.g. using a dedicated holder or being held by a passenger of the vehicle. Thus, in an exemplary embodiment, the at least one further entity is a vehicle and the information indicative of the velocity is indicative of a velocity of the at least one apparatus and of the at least one further entity.

Alternatively or in addition, the method according to the first aspect may be performed by the at least one second apparatus discussed further herein, for example by one or more external network servers. In this case, obtaining or causing obtaining information indicative of a variation in intensity of light may comprise obtaining or causing obtaining the information from the at least one first apparatus, e.g. from a mobile device via a network connection. The information may beforehand be obtained, e.g. detected, by or at the at least one first apparatus, e.g. the mobile device. Further, obtaining or causing obtaining information indicative of a velocity of at least one first apparatus and/or of at least one further entity may in this case be performed by and/or at the at least one second apparatus. In other words, any processing for determining the velocity of the at least one first apparatus and/or of the at least one further entity (e.g. the vehicle) may be offloaded to one or more external network servers. This embodiment may provide an advantage in that processing requirements are reduced for the at least one first apparatus.

The at least one apparatus may further correspond to or be adapted for a navigation system e.g. of a vehicle such as a car or a motorcycle. Thereby, being adapted for is to be understood that the at least one first apparatus may correspond to one or more processors, e.g. of a mobile device such as a smartphone or of a vehicular navigation system. In this case, the at least one first apparatus according to the first or second aspect may in an exemplary embodiment be configured to detect or cause detecting an intensity of light emitted from the at least two light sources as a function of time and/or space using a dedicated light sensor and/or a camera of (installed at and/or comprised by) the vehicle and may thus obtain information indicative of a variation of the intensity based on the detected intensity.

In an exemplary embodiment, the method according to the first and the second aspect disclosed herein is or comprises a navigation method for determining a position and/or a velocity of the at least one first apparatus. For example, the at least one first apparatus may correspond to or comprise a navigation system installed in a vehicle (e.g. a car or motorcycle), may correspond to or comprise a mobile device as mentioned above carried by (e.g. removably installed in) a vehicle and used for navigating the vehicle, or may correspond to one or more processors of such navigation system or such mobile device.

In this exemplary embodiment, the method may comprise one or more of the following:
- obtaining or causing obtaining (e.g. estimating or causing estimating at or by the at least one first apparatus) an estimate of a position of the at least one apparatus based on navigation data;
- obtaining or causing obtaining (e.g. receiving or causing receiving) navigation data (e.g. from at least one GNSS satellite);
- relating or causing relating obtained navigation data and/or an estimate of a position of the at least one apparatus obtained based on navigation data to data representative of a map comprising at least the segment of the road.

For example, in an exemplary embodiment, the navigation data may comprise GNSS data, i.e. data acquired by the at least one first apparatus from one or more GNSS satellites (typically from at least four GNSS satellites) orbiting the earth. Alternatively, or in addition, the navigation data (e.g. in case the at least one apparatus corresponds to a mobile device navigating within a building) may be data acquired via a network connection, e.g. via a WLAN connection.

Thus, in general, the method according to the first aspect may in such embodiment be part of a navigation method, e.g. a navigation method based on GNSS data, e.g. using a GPS, Galileo, and/or GLONASS navigation system. The method may be advantageously used in particular in cases where GNSS satellite signal reception is poor or unavailable and may then advantageously help to continue navigation until satellite signal reception becomes better or available again.

It is noted that, the methods according to the first, the second and the third aspect being related to navigation, each of the methods does not comprise a communication method based on information encoded into visible light signals. Thus, in an exemplary embodiment, the at least one first apparatus is not configured to communicate information encoded into visible light signals with the at least one second apparatus or with another at least one first apparatus. Further, in an exemplary embodiment, the at least one first apparatus is not configured to encode (e.g. based on a demodulated visible light signal) identification information of any of the at least two light sources from light emitted from any of the at least two light sources. Further, methods according to the present invention do not comprise any step of or requiring modulating or demodulating visible light signals. In other words, methods according to the present invention are particularly advantageous as compared e.g. to communication methods based on visible light signals (light signals being modulated to encode respective information), methods according to the present invention are applicable with any standard lamps and do not require any particular modulating or demodulating.

For example, the method may comprise steps of navigating the at least one first apparatus such as e.g. receiving signals from GNSS satellites (an example of obtaining or causing obtaining navigation data), determining a position of the at least one first apparatus based on the received signals (an example of obtaining or causing obtaining an estimate of a position of the at least one apparatus based on navigation data) and may relate the obtained position estimate to corresponding map data (relating or causing relating obtained navigation data and/or an estimate of a position of the at least one apparatus obtained based on navigation data to data representative of a map comprising at least the segment of the road). The latter step may enable displaying a position of the at least one first apparatus (e.g. of a mobile device carried in, e.g. being removably attached inside of, a vehicle such as a car) on a display e.g. of the at least one first apparatus. In case reception e.g. of GNSS signals may become poor or unavailable, the method may switch to or use in addition the mentioned steps of obtaining information indicative of the variation in intensity (e.g. data representative of the variation in intensity) and of obtaining information indicative of a velocity (e.g. data representative of the velocity) of the at least one first apparatus based thereon.

For example, such GNSS satellite based navigation may be employed for navigating the at least one first apparatus along a road until e.g. GNSS reception becomes poor or lost when a vehicle in which the at least one first apparatus is carried enters a tunnel. For example, the at least two light sources may correspond to lamps positioned along a road inside of a tunnel (e.g. along a ceiling of the tunnel), whereby the segment of the road may correspond to a part of or an entire road through the tunnel. In such case, the mentioned step of obtaining information indicative of the light intensity becomes applicable as the mobile device (e.g. using its camera or a different light sensor) may start monitoring light intensity which varies in accordance with the vehicle passing positions near lamps (light intensity maxima) or positions in between lamps (light intensity minima) once the vehicle enters the tunnel. Usually, lamps inside of a tunnel are arranged at regular or approximately regular intervals. Therefore, in an exemplary embodiment, light (e.g. a light intensity or luminosity) emitted from the at least two light sources positioned along the road segment forms an essentially periodical function with respective peaks or maxima (e.g. in intensity or luminosity) at positions corresponding to positions of the at least two light sources and respective minima (e.g. in intensity or luminosity) at positions in between positions of the at least two light sources. Thus, when moving along the segment of the road, light (e.g. a light intensity or luminosity) may be detected with a corresponding sensor arranged at the vehicle or at the mobile device (e.g. at the smartphone, e.g. the sensor corresponding to a smartphone camera), whereby a measured or detected light intensity forms a (intensity or luminosity) function that is essentially periodical in time, whereby a maximum is detected when the vehicle or mobile device passes one of the at least two light sources and whereby a minimum is detected when the vehicle or mobile device is in between two of the at least two light sources. It is noted that when using a camera of a mobile device (e.g. a smartphone camera) as light sensor for detecting the light intensity, light intensity information may be derived from individual images e.g. taken at individual instances in time or continuously e.g. as stream of images when using such camera in video mode.

Thus, as mentioned above, according to the first aspect, the method comprises a step of obtaining (e.g. a mobile device may be configured to obtain and/or an external server may be configured to obtain, e.g. via a network connection) or causing obtaining (e.g. one or more processors of a mobile device and/or of a server may be configured to cause the mobile device and/or the server to obtain) information indicative of a variation in intensity of light emitted from at least two light sources positioned along a segment of a road. It is noted that this step and the corresponding function becomes applicable in any situation where a mobile device (or a corresponding system installed in a vehicle) can be enabled to acquire a light signal of essentially regularly varying intensity, e.g. from lamps positioned along a highway or from lamps positioned at essentially equal mutual distance along roads inside or outside of towns, cities or villages. It is further noted that obtaining or causing obtaining information indicative of a variation in intensity of light may in an exemplary embodiment comprise detecting or causing detecting a light intensity (e.g. by a camera of a mobile device), converting or causing converting the detected light intensity into data representative of the variation in intensity of the light; and optionally at least temporary storing or causing at least temporary storing the data representative of the variation in intensity of the light at the at least one first apparatus.

As mentioned above, and as exemplified in more detail below, based on monitoring such periodic variation of light intensity when moving along a road section with lamps positioned essentially regularly, the method according to the first aspect further comprises obtaining or causing obtaining information indicative of a velocity of the at least one first apparatus based at least on the information indicative of the variation in intensity. It is noted that in an exemplary embodiment, the velocity is a velocity (e.g. a current velocity) of the at least one first apparatus when (e.g. while) moving along at least part of the segment of the road. It is further noted that obtaining or causing obtaining information indicative of a velocity of the at least one first apparatus may in an exemplary embodiment comprise obtaining or causing obtaining data representative of the velocity of the at least one first apparatus; and optionally at least temporary storing or causing at least temporary storing the data representative of the velocity of the at least one first apparatus.

In an exemplary embodiment, the method further comprises detecting or causing detecting light emitted from the at least two light sources while moving along at least part of the segment of the road. For example, a mobile device may be equipped with a dedicated light sensor configured for detecting light or a camera of such mobile device may be configured for (for example based on dedicated software installed at the mobile device) detecting the light. This step of detecting of light may be initiated manually (e.g. by a user using a corresponding software application) or may be automatically initiated (e.g. by a running software application) in case a mobile device notes loss of navigation signal reception or notes that a quality of a received navigation signal is below a predefined threshold. In other words, in an exemplary embodiment the method may comprising triggering the detecting or causing detecting when reception of the navigation signal becomes unavailable (connection e.g. to a GNSS satellite is lost). In an exemplary embodiment, the method may alternatively or additionally comprise monitoring a reception quality of a navigation signal (e.g. comparing an indication of reception quality such as an RSSI (Received Signal Strength Indication) to a predefined threshold) and triggering or causing triggering the detecting or causing detecting when the reception quality falls below a predefined threshold.

In an exemplary embodiment, the information indicative of the variation in intensity comprises a temporal frequency at which the intensity varies at least while moving along the part of the segment. When detecting the light intensity, a mobile device may be configured e.g. to count maxima and/or minima when the vehicle passes positions of lamps or in between lamps, respectively. The mobile device may further be configured to relate a number of maxima/minima to a time during which the same are acquired and may in this way estimate a temporal frequency. In order to cope with variations in mutual distance between pairs of adjacent light sources, the mobile device may in an exemplary embodiment be configured to average multiple determined frequencies (corresponding to multiple mutual distances). In other words, irrespective of such usual variations (being a result of imperfectly positioned light sources), in an exemplary embodiment, the detected intensity of light is (at least essentially) periodic in time and/or space (i.e. along the road segment). Thus, obtaining information indicative of a variation in intensity may be understood as obtaining information indicative of a periodicity of a periodic intensity function. With the information indicative of the variation in intensity in an exemplary embodiment comprising or corresponding to a temporal frequency, the information indicative of the variation in intensity may be representable by a number (or information indicative of this number) of intensity maxima, minima or cycles per time unit.

By measuring or detecting the variation of the intensity of light emitted from lamps positioned within a tunnel or of streetlights positioned along a street (e.g. inside of a village or city) or a road (e.g. outside of a village or city) it thus becomes possible to estimate a velocity e.g. of a vehicle independently of external signals such as GNSS signals. Thus, when for example using a mobile device inside of a car for navigation of the car, navigation can be continued even if the vehicle enters a region of poor or unavailable GNSS signal connection, e.g. a tunnel. In one example, the periodic variation of the light intensity may be monitored to determine a current velocity by relating a current variation of light intensity to an initial variation of the light intensity at an initial part of the region of poor or unavailable signal connection. Using an initial velocity of the vehicle at this initial part (e.g. known from still available GNSS data), the current velocity can be determined using the relation between current variation and initial variation. In another example, a current velocity can be determined based on the current variation of light intensity and knowledge of a distance between pairs of light sources. Thus, as mentioned above, according to the first aspect of the present invention, the method comprises obtaining or causing obtaining information indicative of a velocity of the at least one first apparatus based at least on the information indicative of the variation in intensity.

The method thus provides a means to continue navigation in case navigation signals such as GNSS signals become unavailable, this method being independent of sensors such as inertia sensors with potentially limited accuracy.

In an exemplary embodiment, the method comprises obtaining or causing obtaining information indicative of a mutual distance between the at least two light sources. This information may represent in particular an average value indicating a number of light sources per length of the segment of a road. In this sense, the information may represent an estimate of a mutual distance between a pair of adjacent light sources for example measured in meters. In an exemplary embodiment, the information indicative of the mutual distance comprises a spatial frequency of a variation of light emitted from the at least two light sources at least along the segment of the road. Such spatial frequency is advantageous in that it suitably represents a number of light sources per road segments and thus provides a suitable estimate of a mutual distance between pairs of adjacent light sources.

It is noted that information indicative of the mutual distance may in an exemplary embodiment correspond to data representative of the mutual distance and the method may in an exemplary embodiment comprise storing or causing storing at least temporarily the data representative of the mutual distance.

While a number of light sources per road segment may provide a suitable estimate of the information indicative of the mutual distance between light sources, it is noted that the present invention is not limited thereto. In other words, information indicative of the mutual distance may also correspond to a collection of individual distances between pairs of adjacent lamps along the road segment.

In an exemplary embodiment, the method further comprises obtaining or causing obtaining the information indicative of the velocity of the at least one first apparatus based on the information indicative of the variation in intensity and the information indicative of the mutual distance. For example, if lamps are positioned e.g. at a ceiling of a tunnel very 20 meters, a periodic function (referred to as "$L_s$" in the following) describing a light intensity along a road through the tunnel has a peak or maximum every 20 meters. In other words, a spatial frequency $F(L_s)$ of such function is ¹⁄₂₀ cycles per meter. If a vehicle moves along the road and the light intensity is detected (e.g. using a sensor of the car or of a mobile device as described above), a frequency at which e.g. the peaks are measured depends on the velocity of the vehicle. Assuming the measured intensity function (referred to as "La" in the following) has a peak e.g. every 5 seconds, a corresponding measured light intensity function has a temporal frequency of $F(L_d)$ ⅕ cycles per second. The velocity of the vehicle can then be determined as $F(L_d)/F(L_s)$=4 m/s.

Thus, in an exemplary embodiment, the method comprises the following steps:
- obtaining or cause obtaining (e.g. estimate or cause estimating at the at least one first apparatus/receive or cause receiving from at least one second apparatus) a (spatial) frequency $F(L_s)$ of $L_s$ for the segment of the road, the frequency $F(L_s)$ being e.g. defined in cycles per meter;
- obtaining or cause obtaining (e.g. estimate or cause estimating at the at least one first apparatus) a frequency $F(L_d)$ of La e.g. when a vehicle moves along the segment of the road, the frequency $F(L_d)$ being e.g. defined in cycles per second;
- obtaining or cause obtaining (e.g. estimate or cause estimating at the at least one first apparatus) a velocity as $$v = \frac{F(L_d)}{F(L_s)}.$$

In an exemplary embodiment, the method further comprises obtaining or causing obtaining the information indicative of the mutual distance between the at least two light sources from at least one external apparatus. The external apparatus (an example of at least one second apparatus as discussed further herein), corresponds in an exemplary embodiment to one or more network servers, e.g. to one or more components of a server cloud. Thus, the information indicative of the mutual distances may be held available as prior information or assistance data at such network server e.g. to be acquired by a mobile device for example upon request. For example, a mobile device may be configured to request the information indicative of the mutual distance from the network server automatically, e.g. when a user initiates a navigation from an initial position to a target position via a route including one or more tunnels and/or predefined sections of a highway or different routes (for example, sections of a highway known to have poor or unavailable GNSS connection, e.g. in mountain areas may be predefined).

Further, the information indicative of the mutual distances may be related to map data. For example, map data representative of a segment of a road may be related to information indicative of (e.g. data representative of) mutual distances of light sources positioned along the segment of the road and may be obtained from the at least one second apparatus (e.g. downloaded from a network server) in combination with the information indicative of the mutual distances. In other words, in an exemplary embodiment the information indicative of the mutual distance between the at least two light sources is related to information indicative of a map (e.g. data representative of the map) comprising at least the segment of the road, and the method further comprises:
- obtaining or causing obtaining the information indicative of the map in combination with the information indicative of the mutual distance between the at least two light sources from an external apparatus, in particular via a network connection.

Alternatively or in addition, information indicative of the mutual distances may be obtained and related to a map already stored at the at least one first apparatus. For example, a user may add information indicative of the mutual distances to a map already stored at a mobile device before using the mobile device for navigation along a particular route. Thus, in other words, in an exemplary embodiment, the method may comprise a step of
- relating or causing relating the obtained information indicative of the mutual distance to information indicative of a map comprising at least the segment of the road held available at the at least one first apparatus.

In an exemplary embodiment, the information indicative of the mutual distance between the at least two light sources is obtained from the at least one external apparatus via a network connection. In an exemplary embodiment a network connection may correspond to a communication path or link in a wireless communication network, in particular a terrestrial wireless communication network like a Wireless Local Area Network (WLAN) or a cellular network. WLAN is for example specified by the standards of the IEEE 802.11 family (http://www.ieee.org/). A cellular network may for example be a mobile phone network like a 2G/3G/4G/5G cellular communication network. The 2G/3G/4G/5G cellular radio communication standards are developed by the 3GPP and presently available under http://www.3gpp.org/. A network connection may further include a Device-to-Device (D2D) communication path (e.g. involving vehicles, mobile devices, Road Side Units (RSU) and/or IOT devices).

In an exemplary embodiment, the method may further comprise providing or causing providing the information indicative of the mutual distance to be held available (e.g. stored) by at least one external apparatus (the at least one second apparatus), e.g. by at least one network server, in an exemplary embodiment via the network connection described above. The information indicative of the mutual distance may be made available to the external apparatus in a crowdsourcing process, i.e. in a process in which for example a plurality of mobile devices acquire information indicative of mutual distances between pairs of adjacent light sources (e.g. an average distance per road segment and/or individual distances for at least a group of pairs of light sources along the segment) for a plurality of road segments (e.g. for a plurality of tunnels) and provide the respective information to one or more external apparatuses (the at least one second apparatus). In such way, information may become available for a large area e.g. covered by mobile devices being carried in respective vehicles.

Thus, a mobile device passing (e.g. being carried in a vehicle) a tunnel may for example count a number of lamps (e.g. a number of maxima of a detected light intensity function) in the tunnel and may send the number, and/or the number in combination with a length of the tunnel (derived e.g. from map data stored at the mobile device) as average mutual distance between pairs of adjacent lamps or as spatial frequency $F(L_s)$ to the external apparatus via the network connection. In other words, it is thus possible to determine speed by computing maxima and minima of the light intensity, this approach being advantageous as it is particularly incomplex.

Alternatively or in addition, in an exemplary embodiment, the spatial frequency $F(L_s)$ may be obtained as an example of the mutual distance between the at least two light sources at the at least one first apparatus and/or at the at least one second apparatus (when offloading processing as mentioned above) using a spatial frequency estimating algorithm. This approach is of particular advantage as it takes into account that a real light intensity function may in certain cases comprise fluctuations (and thus respective secondary maxima and minima) for example as a result of light reflections or secondary light sources (e.g. lights of the cars or lamps of a different lane/road). The following approach being based on an autocorrelation turned out to advantageously compensate for such fluctuations of the intensity function. In an exemplary embodiment, the spatial frequency estimating algorithm may be implemented as follows:

A first step comprises:
obtaining or cause obtaining a length/of the segment of the road.

For example, the length of the segment of the road may be obtained based on GNSS signals accessible in advance to entering the segment of the road (e.g. before entering a tunnel) and after having passed the segment of the road (e.g. after having passed the tunnel). Alternatively or in addition, the length of the segment of the road may be obtained at the at least one first apparatus (e.g. at the mobile device) and/or at the at least one second apparatus based on corresponding map data stored at the at least one first apparatus and/or at the at least one second apparatus.

A next step comprises:
detecting or cause detecting a light intensity signal $L_s$.

For example, a mobile device may detect the intensity of light emitted from lamps arranged along a road segment inside of a tunnel using its camera and may locally at least temporary store the detected light intensity as a corresponding periodic function. When the method according to the first aspect is performed by the at least one second apparatus, the at least one second apparatus may obtain the detected light intensity and/or the periodic function via a network connection.

A next step comprises:
estimating or cause estimating (at the at least one first apparatus and/or at the at least one second apparatus) an autocorrelation of the detected light intensity signal $L_s$:

$$R_{L_M}(\tau) = \Sigma_{n \in 1 \ldots N} L_M(n) L_M(n-\tau),$$

where N is the number of samples in $L_s$. A number of samples corresponds to a number of measurement samples measuring the corresponding intensity signal.

Based thereon, a next step comprises:
estimating or cause estimating (at the at least one first apparatus and/or at the at least one second apparatus) a number $t_C$ of signal samples of the detected signal in one cycle as:

$$t_C = \underset{\tau}{\mathrm{argmax}}\, R_{L_M},$$

and
estimating or cause estimating (at the at least one first apparatus and/or at the at least one second apparatus) a number of cycles $N_C^S$ of $L_s$ at the road segment as:

$$N_C^S = \frac{N}{t_C},$$

where
N is the total number of samples in $L_s$, measured along the segment of the road. The method then comprises a step of estimating or cause estimating (at the at least one first apparatus and/or at the at least one second apparatus) the frequency $F(L_s)$ (e.g. in cycles per meter) as $$F(L_s) = \frac{N_C^S}{l}.$$

It is noted that alternatively or in addition, a low path filtering (e.g. a moving average) of the light intensity signal can be employed before counting maxima/minima of the filtered intensity signal to separate derive the (main) frequencies of the signal and to thus compensate for undesirable secondary maxima/minima. Yet alternatively or in addition, principal (main) frequencies can be computed by computing a Fourier transform of the detected signal and by separating frequencies with a magnitude above a predefined threshold to be used for determining the speed.

Alternatively or in addition, for example knowing its velocity when passing through the tunnel (e.g. based on a length of the tunnel determined based on map data, an initial time when entering the tunnel and an end time when leaving the tunnel), the mobile device may directly estimate actual mutual distances between pairs of adjacent lamps and may transmit determined mutual distances as a data set corresponding to the tunnel to the external apparatus via a network connection.

In an exemplary embodiment, the method according to the first or second aspect comprises at least one of the following:

determining or causing determining an absolute velocity of the at least one first apparatus, wherein the absolute velocity corresponds to the information indicative of the velocity of the at least one first apparatus;

obtaining or causing obtaining an initial velocity of the at least one apparatus at a first part of the segment of the road and estimating or causing estimating a relative change of velocity of the at least one first apparatus at a second part of the segment of the road based on the initial velocity and the information indicative of the variation in intensity.

In other words, in embodiments the information indicative of a velocity may be indicative of an absolute velocity or relative change of velocity, e.g. of an absolute value such as 4 m/s in the case of the above example or a relative value such as "1 m/s more than an initial velocity of 3 m/s". Thus, in the latter case of a relative change of velocity, for example a mobile device may be configured to assume a velocity e.g. acquired based on navigation (e.g. GNSS) signals shortly before entering a tunnel or an area of poor or lacking navigation signal reception as corresponding to the velocity when entering the tunnel or the area of poor or lacking navigation signal reception. In other words, in an exemplary embodiment the method may comprise obtaining or causing obtaining a velocity of the at least one first apparatus when moving along a prior segment of the road adjacent and prior to the segment of the road as the initial velocity. As mentioned, in an exemplary embodiment, the road segment is a segment inside of a tunnel and the method thus comprises obtaining or causing obtaining a velocity of the at least one first apparatus when entering the tunnel as the initial velocity.

As mentioned above, the in accordance with the first and the second aspect, the method comprises providing or causing providing the information indicative of the mutual distance to be accessible by at least one external apparatus.

In other words, in particular the second aspect is directed towards the above mentioned crowdsourcing process of the present disclosure according to which mutual distances between pairs of light sources may be acquired by the at least one first apparatus, e.g. by plural mobile devices, while passing (e.g. being carried within a vehicle passing through) areas of poor or lacking GNSS reception such as tunnels, or roads or highways, e.g. in mountain or rural areas.

It is noted that providing or causing providing to be accessible may in an exemplary embodiment be understood as comprising at least a step of preparing or causing preparing data representative of the mutual distance between the at least two light sources to be transmittable from the at least one first apparatus to the at least one external apparatus. In an exemplary embodiment, providing or causing providing to be accessible may further comprise transmitting data representative of the mutual distance between the at least two light sources to the at least one external apparatus.

As in the first case, in an exemplary embodiment, also the method according to the second aspect is a navigation method for determining a position and/or a velocity of the at least one first apparatus, the method comprising at least one of the following:

obtaining or causing obtaining an estimate of a position of the at least one apparatus based on navigation data;
obtaining or causing obtaining navigation data;
relating or causing relating obtained navigation data and/or an estimate of a position of the at least one apparatus obtained based on navigation data to data representative of a map comprising at least the segment of the road.

Thus, in additional to performing steps in relation to collecting information indicative of mutual distances between pairs of light sources based on a crowdsourcing procedure, a mobile device (an example of the at least one first apparatus) may be configured to of perform steps of navigation based on navigation signals such as GNSS signals. In addition, such mobile device may in an exemplary embodiment be configured to perform any of the steps discussed above in relation to the first aspect.

In an exemplary embodiment, the method according to the second aspect comprises:

obtaining or causing obtaining information indicative of a length of the segment of the road; and
estimating or causing estimating the information indicative of the mutual distance between the at least two light sources based at least on the information indicative of the length of the segment of the road.

As mentioned above in the case of the first aspect, a length l of the segment of the road may be obtained based on GNSS signals accessible in advance to entering the segment of the road (e.g. before entering a tunnel) and after having passed the segment of the road (e.g. after having passed the tunnel). Alternatively or in addition, the length of the segment of the road may be obtained at the at least one first apparatus (e.g. at the mobile device) based on corresponding map data stored at the at least one first apparatus. Given this length, the information indicative of the mutual distance may then be acquired e.g. by counting the number of light sources along the segment of the road (e.g. by counting maxima and/or minima of an intensity of light detected while moving along the segment of the road) or using the above described spatial frequency estimating algorithm. In other words, in an exemplary embodiment of the second aspect, the information indicative of a variation in intensity of light emitted from at least two light sources comprises a spatial frequency $F(L_s)$, the method further comprising one or more of the following:

obtaining or cause obtaining a length l of the segment of the road;
detecting or cause detecting a light intensity signal $L_s$;
estimating or cause estimating an autocorrelation of the detected light intensity signal $L_s$:

$$R_{L_M}(\tau) = \Sigma_{n \in 1 \ldots N} L_M(n) L_M(n-\tau);$$

where N is the total number of samples in $L_s$;
estimating or cause estimating a number $t_C$ of signal samples of the detected signal in one cycle as:

$$t_C = \underset{\tau}{\mathrm{argmax}}\, R_{L_M};$$

estimating or cause estimating a number of cycles $N_C^S$ of $L_s$ at the road segment as:

$$N_C^S = \frac{N}{t_C},$$

and
> estimating or cause estimating the frequency $F(L_s)$ (e.g. in cycles per meter) as $$F(L_s) = \frac{N_C^S}{l}.$$

According to the third aspect, a method is provided which is performed by at least one second apparatus. In an exemplary embodiment, the at least one second apparatus comprises one or more network servers such as for example one or more components of a server cloud. It is noted that network server is to be understood in general as encompassing any device connected to a network (e.g. to the Internet) and connectable to the at least one first apparatus and that it configured to hold available at least the information indicative of a mutual distance between the at least two light sources to be accessible for the at least one first apparatus. Such device may in particular also correspond to or comprise a Road Side Unit (RSU) or a storage device installed in a vehicle. In an exemplary embodiment, the at least one second apparatus is configured to be connected to the at least one first apparatus (and vice versa) via the above mentioned network connection. Thus, in an exemplary embodiment of the third aspect, a network connection corresponds to a communication path or link in a wireless communication network, in particular in a terrestrial wireless communication network like a Wireless Local Area Network (WLAN) or a cellular network. WLAN is for example specified by the standards of the IEEE 802.11 family (http://www.ieee.org/). A cellular network may for example be a mobile phone network like a 2G/3G/4G/5G cellular communication network. The 2G/3G/4G/5G cellular radio communication standards are developed by the 3GPP and presently available under http://www.3gpp.org/. A network connection may further include a Device-to-Device (D2D) communication path (e.g. involving vehicles, mobile devices, Road Side Units (RSU) and/or IOT devices).

As mentioned, the method according to the third aspect comprises
> accessing or causing accessing information indicative of a mutual distance between at least two light sources positioned along at least one respective road segment.

In an exemplary embodiment, accessing or causing accessing the information indicative of a mutual distance comprises receiving or causing receiving the information indicative of a mutual distance. For example, the information indicative of the mutual distance may be received from the above disclosed at least one first apparatus (e.g. a mobile device) having collected corresponding data in a crowdsourcing process, the information being received e.g. via the disclosed network connection. According to the third aspect, the method further comprises
> holding or causing holding available the information indicative of the mutual distance.

For example, the at least one second apparatus may be configured to store the received information as data representative of the mutual distance at a corresponding storage. In particular, in an exemplary embodiment, the at least one second apparatus is configured to hold available information indicative of a plurality of mutual distances between pairs of light sources positioned along respective road segments, e.g. received from a plurality of mobile devices having collected corresponding data in a crowdsourcing process.

According to the third aspect, the method further comprises
> providing or causing providing the information indicative of the mutual distance to be accessible by at least one external apparatus (e.g. by the at least one first apparatus, e.g. by a mobile device).

Thereby, providing or causing providing to be accessible may in an exemplary embodiment be understood as comprising at least a step of preparing or causing preparing data representative of the mutual distance between the at least two light sources to be transmittable from the at least one second apparatus to the at least one external apparatus (e.g. the at least one first apparatus). In an exemplary embodiment, providing or causing providing to be accessible may further comprise transmitting data representative of the mutual distance between the at least two light sources to the at least one external apparatus (e.g. to the at least one first apparatus).

Thus, for example, the at least one second apparatus may be configured to transmit or send the information indicative of the mutual distance in form of corresponding data representative of the mutual distance to the disclosed at least one first apparatus, e.g. to a mobile device, e.g. upon having received a corresponding request. In other words, in an exemplary embodiment, the at least one second apparatus is configured to receive a request for information indicative of a mutual distance between pairs of light sources positioned along a specific road segment, e.g. from a mobile device that moves or will move along this specific road segment. The at least one second apparatus is in an exemplary embodiment then configured to provide or cause providing the information indicative of the mutual distance between pairs of light sources positioned along the specific road segment to be accessible by an external apparatus. For example, the at least one second apparatus may be configured to transmit or send the requested information to the at least one first apparatus, e.g. the mobile device, having requested the information.

Thus, the information indicative of the mutual distance between the at least two light sources may correspond to assistance data that may be provided e.g. to a mobile device for determining a velocity e.g. of a vehicle in which the mobile device travels based on a detected variation of intensity of light emitted from the light sources in case for example GNSS signal reception is poor or unavailable.

As mentioned above, the methods according to the first, the second and the third aspect being related to navigation, each of the methods does not comprise a communication method based on information encoded into visible light signals. In other words, methods according to the present invention are particularly advantageous as compared e.g. to communication methods based on visible light signals (light signals being modulated to encode respective information), methods according to the present invention are applicable with any standard lamps and do not require any particular modulating or demodulating.

It is to be understood that the presentation of the invention in this section is merely by way of examples and non-limiting.

Other features of the invention will become apparent from the following detailed description considered in conjunction with the accompanying figures. It is to be understood, however, that the figures are designed solely for purposes of illustration and not as a definition of the limits of the invention, for which reference should be made to the appended claims. It should be further understood that the

DETAILED DESCRIPTION OF THE FIGURES

The following description serves to deepen the understanding of the present invention and shall be understood to complement and be read together with the description of example embodiments of the invention as provided in the above SUMMARY section of this specification.

Figure 1:
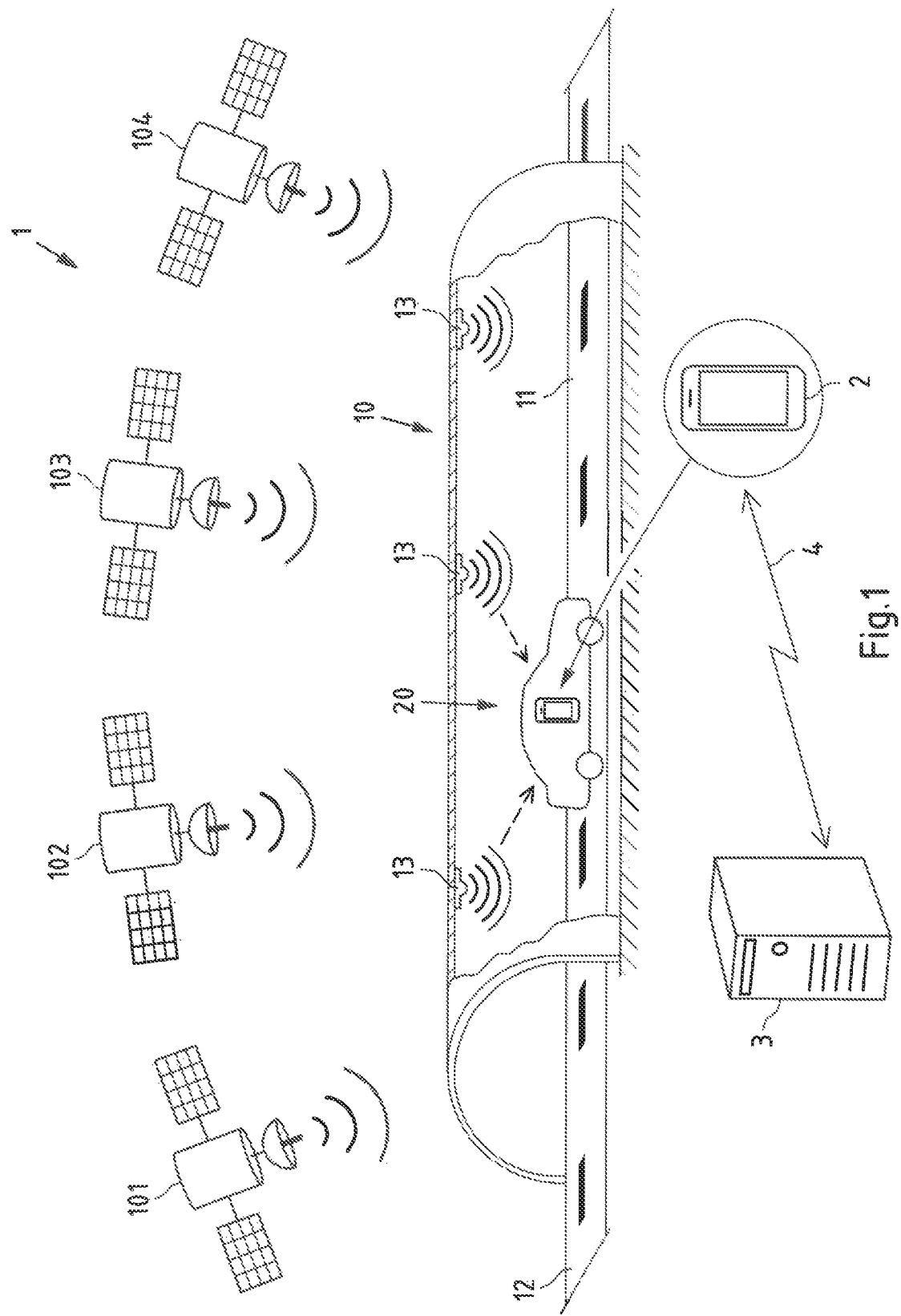
FIG. 1 is a block diagram of an exemplary embodiment of a system according to the invention.

FIG. 1 is a schematic high-level block diagram of a system 1 according to an exemplary embodiment of the invention. Without limiting the scope of the invention, it is assumed in the following that the at least one first apparatus is embodied as a mobile device 2 for example carried by a driver of or removably installed in a vehicle 20 driving through tunnel 10 along a segment 11 of a road.

For illustrative purposes, FIG. 1 shows four GNSS satellites 101, 102, 103 and 104 of a GNSS system like the Galileo, the GPS or the GLONASS system. Each GNSS satellite of GNSS satellites 101 to 104 (e.g. periodically or repeatedly or continuously) broadcasts a respective GNSS signal containing respective GNSS navigation data. Mobile device 20 is configured to estimate its position and/or velocity (e.g. using suitable software installed at mobile device 20) based on navigation data received from GNSS satellites 101 to 104. Mobile device is in particular configured to estimate position and/or velocity in areas of satisfactory GNSS satellite signal reception, e.g. outside of tunnel 10, for example when vehicle 20 drives along prior segment 12 of the road which is adjacent and prior to the segment 11 inside of tunnel 10. When entering tunnel 10, GNSS signal reception may become poor (e.g. fall below a predetermined threshold set at the mobile device 20) and/or become unavailable. Mobile device 2 may in such case be configured to continue estimating position and/or velocity using inertia sensors such as for example gyroscopes and/or accelerometers.

In addition or alternatively to a use of such inertia sensors, methods according to the aspects of the present invention provide a solution to continue navigation (in particular estimation of velocity) to improve accuracy of navigation in areas of poor or non-available GNSS navigation signals. As described in detail above, in such scenarios, aspects of the present invention enable estimating a speed of the mobile device (and thus of the vehicle in which the mobile device is carried) based on an intensity of light emitted from light sources measured by the device.

System 1 comprises a mobile device 2 and a server 3 which may communicate with each other via communication path 4. Communication path 4 may be a direct or indirect communication path. For example, communication path 4 may comprise one or more hops, for example one or more communication links or communication connections. In the following, it is assumed that communication path 4 is a wireless communication connection in a cellular communication network like a 2G/3G/4G/5G cellular communication network. It is however to be understood that the invention is not limited to this.

System 1 is not limited to a single server 3, but may optionally comprise a plurality of servers (e.g. forming a server cloud). Accordingly, server 3 may be part of such a plurality of servers (e.g. a server cloud) or may be represented by such a plurality of servers (e.g. a server cloud).

Server 3 may be part of a cellular communication network and may provide mobile devices of this cellular communication network with GNSS navigation data of at least one of GNSS satellites 101 to 104 as part of or as GNSS assistance data. In particular, these GNSS navigation data may be provided by the server as part of or as GNSS assistance data according to an assisted GNSS based positioning solution like assisted GPS or assisted Galileo. An example of such an assisted GNSS based positioning solution is assisted Global Navigation Satellite System (A-GNSS) as specified by the 3GPP. For example, Server 3 may provide GNSS navigation data of at least one of GNSS satellites 101 to 104 as part of or as GNSS assistance data by transmitting the GNSS assistance data via wireless communication path 110 to mobile device 2.

For example, mobile device 2 may be one of a smartphone, a tablet computer, a notebook computer, a smart watch, and a smart band. Mobile device 2 may support the GNSS based positioning solution of system 1. This may be understood to mean that mobile device 2 is configured to estimate its position (e.g. determine a position estimate of its position) and accordingly estimate its velocity at least partially based on GNSS signals observed at this position and corresponding GNSS navigation data of GNSS satellites 101 to 104.

System 1 further comprises lamps 13 (examples of the at least two light sources) arranged at a ceiling of tunnel 10 at regular intervals along the segment 11 of the road through tunnel 10. Intensity of light emitted from lamps 13 may thus be represented by a spatially periodic intensity function $L_s$ with intensity maxima at positions corresponding to positions of the lamps 13 and with intensity minima at positions corresponding to positions in between the lamps 13. The spatial frequency $L_s$ (an example of information indicative of a mutual distance between the at least two light sources) may be estimated at the mobile device 2 e.g. using the spatial frequency estimating algorithm and/or may be received by mobile device 2 e.g. as or in combination with assistance data. For example, spatial frequencies may be related to map data and may be acquired by mobile device 2 in combination with the map data e.g. when downloading a map from server 3 via network connection 4. Alternatively or in addition, a spatial frequency $L_s$ of Lamps 13 arranged in tunnel 10 may be acquired by mobile device 2 (e.g. after sending a corresponding request to server 3) while vehicle 20 drives along the prior road segment 12 from server 3 via network connection 4.

When moving along the segment 11 of the road through tunnel 10, mobile device 2 may be configured to detect/ monitor/acquire an intensity of light emitted from lamps 13. For example, to this end, mobile device 2 may employ a camera of mobile device 2 configured for this purpose (e.g. based on corresponding software installed at mobile device 2) and/or a dedicated light sensor. Detecting of the light intensity may be initiated manually or may be triggered automatically, e.g. when mobile device 2 notes that a GNSS signal reception is lost and/or falls below a predetermined threshold. In addition or alternatively, detecting of the light intensity may be triggered based on GNSS based position estimates of mobile device 2, e.g. when mobile device 2 notes that it is about to enter a tunnel or a different area that may be labelled as area of poor or unavailable GNSS signal reception in corresponding map data stored at the mobile device 2.

Intensity of light emitted from lamps 13 as detected or monitored by mobile device 2 may be represented by an intensity function $L_d$ periodic in time with intensity maxima at times when vehicle 20 passes positions of the lamps 13 and with intensity minima at times when vehicle 20 passes positions in between the lamps 13. Monitoring or detecting the intensity function $L_d$, mobile device 2 is then configured to estimate its speed and accordingly the speed of vehicle 20 as $$v = \frac{F(L_d)}{F(L_s)}.$$

Thus, aspects of the present invention provide a method to determine a speed of a device when e.g. GNSS signal reception becomes poor or unavailable and thus enable continuing navigation in such instances.

Figure 2:
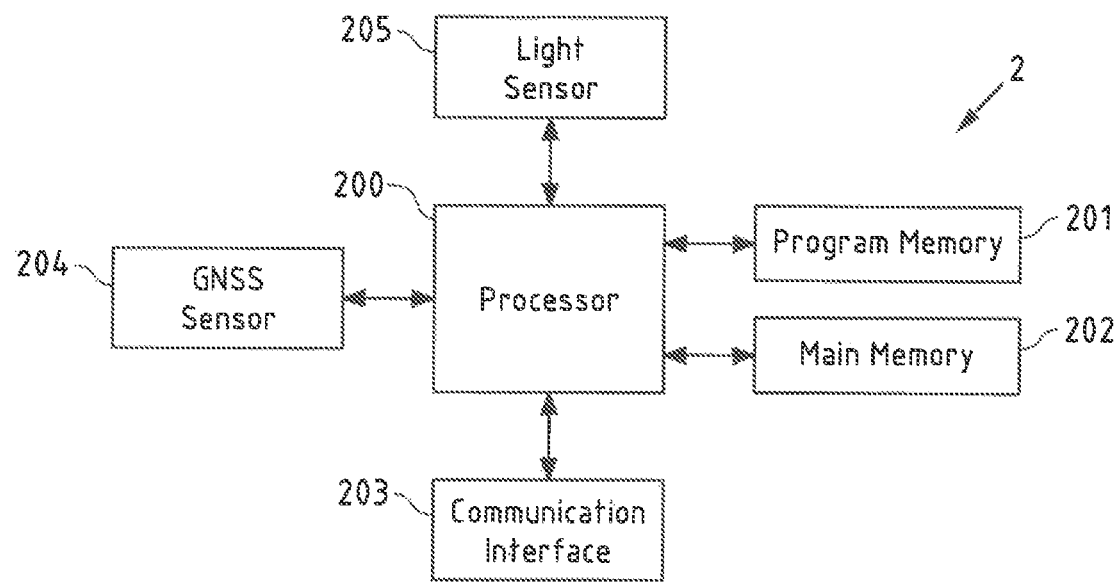
FIG. 2 is a block diagram of an exemplary embodiment of a first apparatus according to the invention.

FIG. 2 is a block diagram of an exemplary embodiment of mobile device 2 according to the invention. In the following, it is assumed that mobile device 2 of FIG. 1 corresponds to this mobile device 2.

Mobile device 2 comprises a processor 200. Processor 200 may represent a single processor or two or more processors, which are for instance at least partially coupled, for instance via a bus. Processor 200 executes a computer program code stored in program memory 201 (e.g. computer program code causing mobile device 2 to perform any one embodiment of the disclosed method according to the first or second aspect (e.g. the steps of any one embodiment of the disclosed method according to the first or second aspect) or a part thereof (e.g. at least some steps of any one embodiment of the disclosed method according to the first or second aspect) (as for instance further described below with reference to FIGS. 4A and 4B), when executed on processor 200), and interfaces with a main memory 202. Program memory 201 may also contain an operating system for processor 200 and further data like GNSS navigation data, map data and/or data representative of mutual distances between light sources for one or more road segments of a map where GNSS signal reception is poor and/or unavailable. Some or all of memories 201 and 202 may also be included into processor 200. One of or both of memories 201 and 202 may be fixedly connected to processor 200 or at least partially removable from processor 200, for example in the form of a memory card or stick.

A program memory (e.g. program memory 201) may for example be a non-volatile memory. It may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable, for instance in the form of a removable SD memory card.

A main memory (e.g. main memory 202) may for example be a volatile memory. It may for example be a DRAM memory, to give non-limiting example. It may for instance be used as a working memory for a processor (e.g. processor 200) when executing an operating system and/or programs.

Processor 200 further controls a wireless communication interface 203 configured for communicating via a cellular network (e.g. to transmit and receive cellular radio signals). For example, wireless communication interface 203 may be or may comprise a 2G/3G/4G/5G radio transceiver. Mobile device 2 may use wireless communication interface 203 to receive information indicative of or data representative of mutual distances between light sources for one or more road segments of a map where GNSS signal reception is poor and/or unavailable (e.g. via wireless communication path 4). Mobile device 2 may further use wireless communication interface 203 to receive GNSS navigation data as part of or as GNSS assistance data from server 3 of system 1 (e.g. via wireless communication path 4).

Moreover, processor 200 controls a GNSS sensor 204 configured for receiving GNSS signals, e.g. broadcasted by GNSS satellites 101 to 104 of FIG. 1. GNSS sensor 204 is configured for (e.g. periodically or repeatedly) scanning for observable GNSS signals (e.g. GNSS signals 105 to 108 broadcasted by GNSS satellites 101 to 104 of FIG. 1). Therein, a respective GNSS signal may be understood to be observable if the respective GNSS signal is receivable with a minimum quality (e.g. a minimum quality enabling a carrier locking and code locking of the respective observed GNSS signal) by GNSS sensor 204.

GNSS sensor 204 enables mobile device 2 to receive GNSS navigation data contained in a message conveyed in an observed GNSS signal. To this end, GNSS sensor 204 may be configured for extracting the GNSS navigation data from the received or observed GNSS signal.

Moreover, GNSS sensor 204 enables mobile device 2 to estimate its position based on GNSS signals observed when scanning for observable GNSS signals at this position. For example, GNSS sensor 204 may be configured for providing processor 200 with data necessary for determining a position estimate of the position of mobile device 2. To this end, GNSS sensor 204 may be configured for determining, for each of the observed GNSS signals, respective GNSS observation data relating to the observation of the respective GNSS signal by GNSS sensor 204 which enable determining a pseudorange between the mobile device and the respective GNSS satellite broadcasting the respective observed GNSS signal.

It is to be understood that any computer program code required for receiving and processing received GNSS signals may be stored in an own memory of GNSS sensor 204 and executed by an own processor of GNSS sensor 204 or it may be stored for example in program memory 201 and executed for example by processor 200.

Mobile device 2 comprises a light sensor 205. Light sensor 205 may be a dedicated light sensor or may be embodied by or comprised by a camera of the mobile device 2, e.g. by a smartphone camera. With light sensor 205, mobile device 2 is configured for detecting or causing detecting a light intensity, e.g. as a function of space (e.g. $L_s$) and/or as a function of time (e.g. La), in particular an intensity of light emitted from the at least two light sources, e.g. from lamps arranged along a ceiling or a sidewall of a tunnel. Using processor 200, (and based on corresponding instructions implemented in software and stored e.g. in program memory 201 and/or main memory 202), mobile device 2 may be configured for converting or causing converting the detected light intensity into data representative of the variation in intensity of the light. Mobile device 2 may store said data in main memory 202 or in a mass storage device of or attached to the mobile device 2. In other words, mobile device 2 may be configured for at least temporary storing or causing at least temporary storing the data representative of the variation in intensity of the light at the mobile device. This exemplary procedure exemplifies mobile device 2 being configured for obtaining or causing obtaining information indicative of a variation in intensity of light emitted from at least two light sources positioned along a segment of a road.

The components 201 to 205 of mobile device 2 may for instance be connected with processor 200 by means of one or more serial and/or parallel busses.

It is to be understood that mobile device 2 may comprise various other components like a user interface for receiving user input.

Figure 3:
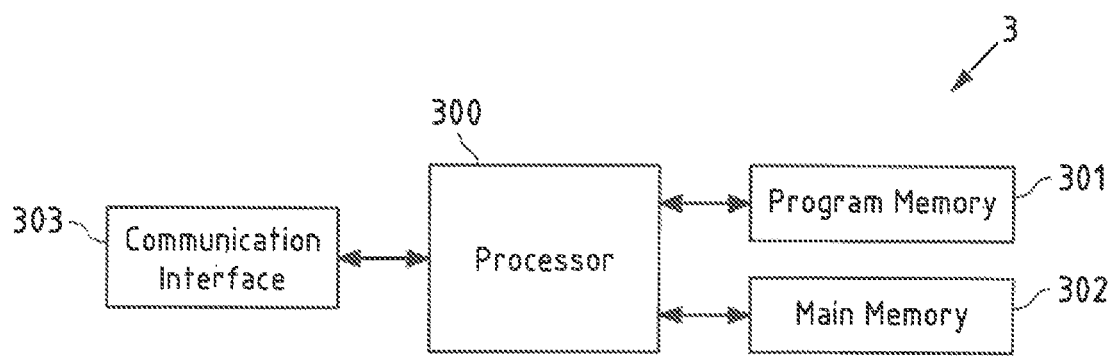
FIG. 3 is a block diagram of an exemplary embodiment of a second apparatus according to the invention.

FIG. 3 is a block diagram of an exemplary embodiment of server 3 according to the invention. In the following, it is assumed that server 3 of FIG. 1 corresponds to this server 3. Server 3 comprises a processor 300. Processor 300 may represent a single processor or two or more processors, which are for instance at least partially coupled, for instance via a bus. Processor 300 may use program memory 301 and main memory 302 to execute a program code stored in program memory 301 (for instance program code causing server 3 to perform embodiments of the different methods, when executed on or by processor 300). Some or all of memories 301 and 302 may also be included into processor 300. One of or both of memories 301 and 302 may be fixedly connected to processor 300 or at least partially removable from processor 300. Program memory 301 may for instance be a non-volatile memory. It may for instance be a FLASH memory, any of a ROM, PROM, EPROM and EEPROM memory or a hard disc, to name but a few examples. Program memory 301 may also comprise an operating system for processor 300. Main memory 302 may for instance be a volatile memory. It may for instance be a RAM or DRAM memory, to give but a few non-limiting examples. It may for instance be used as a working memory for processor 300 when executing an operating system and/or programs.

Processor 300 further controls one or more communication interfaces 303 configured to receive and/or send information. For instance, server 3 may be configured to communicate with mobile device 2 of system 1 of FIG. 1 (corresponding to mobile device 2 of FIG. 2). Such a communication may for instance comprise transmitting information indicative of a mutual distance between at least two light sources of a particular segment of a road mobile device 2 moves on or will move on, e.g. upon request by the mobile device 2. Such a communication may for instance further comprise receiving collected information indicative of mutual distances between at least two light sources of plural road segments from plural mobile devices having moved along the road segments and collected this information performing a crowdsourcing process. The communication may for instance be based on a (e.g. partly) wireless connection. The communication interface 303 may thus comprise circuitry such as modulators, filters, mixers, switches and/or one or more antennas to allow transmission and/or reception of signals. In embodiments of the invention, communication interface 303 is in particular configured to allow communication according to a 2G/3G/4G/5G cellular communication system.

The components 301-303 of server 3 may for instance be connected with processor 300 by means of one or more serial and/or parallel busses.

The methods of the different aspects will now be described in more detail with respect to FIGS. 4A, 4B and 5.

Figure 4A:
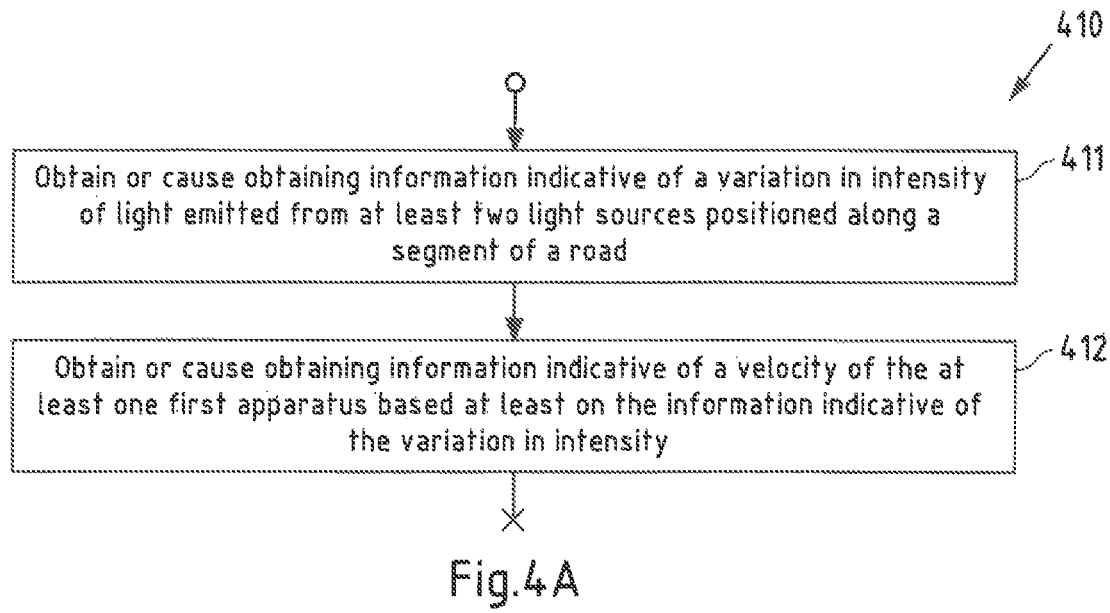
FIG. 4A is a flow chart illustrating an exemplary embodiment of a method according to the first aspect of the invention.

FIG. 4A is a flow chart 410 illustrating an exemplary embodiment of a method according to the first aspect of the invention. Without limiting the scope of the invention, it is assumed in the following that mobile device 2 as disclosed above with respect to system 1 of FIG. 1 performs the steps of flow chart 410.

In a step 411, information indicative of a variation in intensity of light emitted from at least two light sources positioned along a segment of a road is obtained. Thus, mobile device 2 may for example move (being carried by vehicle 20) along road segment 11 inside of tunnel 10 where GNSS signal reception is unavailable. Mobile device 13 may detect an intensity of light emitted from light sources 13, i.e. may monitor the above described light intensity function La which periodically (essentially periodically) varies in time.

In a step 412, information indicative of a velocity of the mobile device 2 (an example of the at least one first apparatus) is obtained based at least on the information indicative of the variation in intensity. In one embodiment, the information indicative of the velocity may be obtained as an absolute velocity value, i.e. as $$v = \frac{F(L_d)}{F(L_s)}$$

as described above. In an alternative or additional embodiment, the information indicative of the velocity may be obtained based on a relative speed change. In this embodiment, the mobile device 2 is configured to obtain an initial velocity at a first part of the segment of the road. For example, mobile device 2 may be configured to obtain its velocity while passing on prior segment 12 of the road outside the tunnel 10, the prior segment 12 being adjacent and prior to the segment 11 of the road inside of tunnel 10. As the prior segment 12 is outside of tunnel 10, mobile device 2 may be configured to obtain its velocity based on GNSS navigation data received outside of tunnel 10. As the prior segment 12 is directly adjacent and prior to segment 11 of the road inside of tunnel 10, mobile device 2 may validly assume that this velocity is a valid estimation for an initial velocity at the entrance of tunnel 10.

In this embodiment, mobile device 2 is then further configured to estimate a relative change of velocity while passing along the segment 11 of the road inside of tunnel 10 based on the initial velocity and the information indicative of the variation in intensity. To this end, mobile device 2 may be configured to relate an initial frequency F(La) at or close to the entrance of the tunnel 10 to the initial velocity determined just before entering tunnel 10. Mobile device 2 may then be configured to relate any change in a monitored frequency $F(L_d)$ to a change in velocity relative to the initial velocity. For example, if at the entrance of tunnel 10, the velocity (e.g. determined based on GNSS signals outside of tunnel 10) is x m/s (initial velocity), and at a position inside of the tunnel, the monitored frequency F(L$_d$) has decreased by 25% as compared to the monitored frequency F(L$_d$) at the entrance of the tunnel 10, a corresponding speed can be estimated to be 0.75% of x m/s.

Figure 4B:
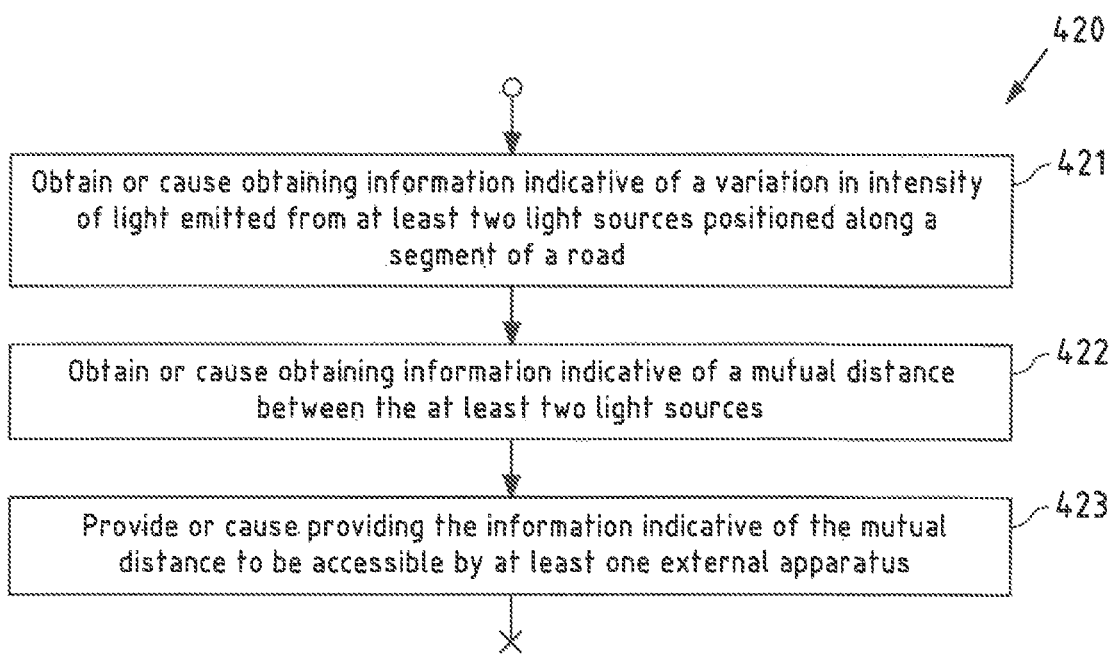
FIG. 4B is a flow chart illustrating an exemplary embodiment of a method according to the second aspect of the invention.

FIG. 4B is a flow chart 420 illustrating an exemplary embodiment of a method according to the second aspect of the invention. Without limiting the scope of the invention, it is assumed in the following that mobile device 2 as disclosed above with respect to system 1 of FIG. 1 performs the steps of flow chart 410.

Thus, in a step 421, mobile device 2 obtains information indicative of a variation in intensity of light emitted from at least two light sources positioned along a segment of a road. Thus, mobile device 2 may for example move (being carried by vehicle 20) along road segment 11 inside of tunnel 10 where GNSS signal reception is unavailable.

In a step 412, information indicative of a mutual distance between the at least two light sources is obtained. As mentioned above, the method according to the second aspect is directed in particular to the crowdsourcing aspect, i.e. to learning phase in which plural mobile devices passing along respective segments of roads through different areas of poor or unavailable GNSS reception (e.g. tunnels, highways or roads with poor GNSS reception) collect respective information indicative of mutual distances between respective pairs of light sources corresponding to the respective segments of the roads and make the corresponding information available to server 3, e.g. by transmitting the information to server 3 via communication path 4.

Thus, in a step 423, the information indicative of the mutual distance is provided to be accessible by at least one external apparatus (e.g. server 3). As explained above, in particular in this learning phase, mobile device 4 may employ the spatial frequency estimating algorithm disclosed in detail above to estimate the spatial frequency F(L$_s$) as example of the information indicative of the mutual distance.

Thus, in this learning or crowdsourcing process, multiple data sets corresponding to multiple road segments 1 . . . K (e.g. illuminated tunnels in a certain area or region such as a country) may be collected by plural mobile devices, may be provided to server 3 and stored at server 3 e.g. a corresponding data set, e.g. related to corresponding map data. The collected data (collected information indicative of the mutual distance) may be grouped according to the road segments, and a respective frequency value F(L$_S^k$) is estimated for each of the road segments and stored at server 3. As different mobile devices may collect slightly different spatial frequencies for a particular road segment as a result of measurement imperfections, different sets of collected data for each of the road segments k, a stored F(L$_S^k$) for the road segment may be obtained e.g. as arithmetic average of frequencies corresponding to the individual probe sets F$_i$(L$_S^k$).

Such frequencies F(L$_S^k$) for each of the road segments may be stored on the server as assistance data. Whenever a vehicle approaches a road segment k, mobile device 2 is configured to retrieve the corresponding F(L$_S^k$), to measure L$_M$, and to estimate the speed as described above.

Figure 5:
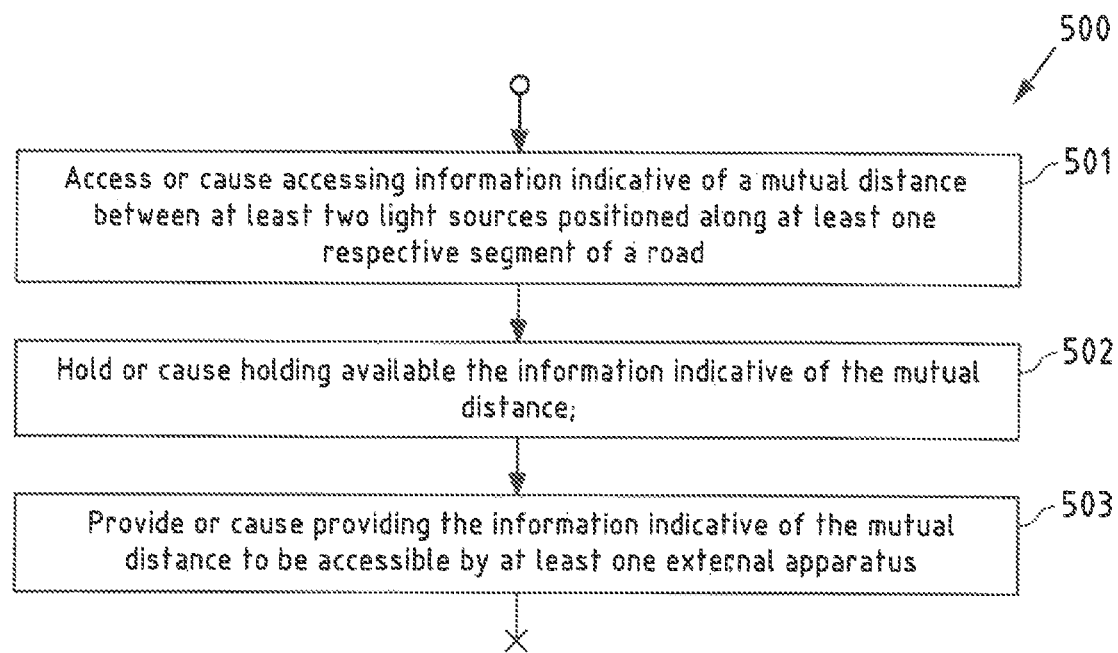
FIG. 5 is a flow chart illustrating an exemplary embodiment of a method according to the third aspect of the invention.

FIG. 5 is a flow chart 500 illustrating an exemplary embodiment of a method according to the third aspect of the invention. Without limiting the scope of the invention, it is assumed in the following that server 3 as disclosed above with respect to system 1 of FIG. 1 performs the steps of flow chart 500.

Thus, in a step 501, server 3 accesses information indicative of a mutual distance between at least two light sources positioned along at least one respective segment of a road. In other words, the at least two light sources are positioned on a same segment of the road. In an exemplary embodiment, the at least two light sources are a pair of adjacent light sources, for example lamps arranged on a ceiling or a side wall of a tunnel or a pair of street lamps arranged along a highway or a different road. As explained above, accessing the information may in an exemplary embodiment comprise receiving the information indicative of the mutual distance for example from one or more mobile devices having collected corresponding data in a crowdsourcing process e.g. via network connection 4 in FIG. 1. For example, one or more mobile devices of a plurality of mobile devices (e.g. being removably installed in a vehicle for navigation purposes) traveling along a respective road segment (of the mentioned road segments 1 . . . K) may collect information indicative of mutual distances between pairs of lamps (for example, but not limited to, pairs of adjacent lamps) and may provide this information (e.g. in form of a respective spatial frequency F(L$_s$)) to server 3 e.g. via network connection 4.

In a step 502, the information indicative of the mutual distance is held available by or at server 3, e.g. in a corresponding mass storage medium of or connected to server 3. For example, the at least one second apparatus may be configured to store the received information as data representative of mutual distances between light sources of respective road segments 1 . . . K in a corresponding storage. As mentioned, the data collected by the one or more mobile devices 2 (collected information indicative of the mutual distance) may be grouped according to the road segments, and a respective frequency value F(L$_S^k$) may be stored at server 3 for each respective road segment as assistance data e.g. to be provided to a mobile device 2 upon request.

Accordingly, in a step 503, the information indicative of the mutual distance is provided to be accessible by at least one external apparatus, e.g. by mobile device 2. For example, when a mobile device 2 carried in a vehicle approaches a road segment k, mobile device 2 may send a request via network connection 4 to server 3 for corresponding assistance data. Server 3 may be configured to respond to this request by sending the corresponding F(L$_S^k$) as or included in assistance data via network connection 4. Based thereon, mobile device 2 may be configured to measure L$_M$, and to estimate the speed as described above.

Thus, as a result, the present invention provides methods that enable navigation and in particular estimating velocity in areas where for example GNSS signal reception is poor or unavailable. The method is for example applicable if a vehicle where a mobile device 2 is used for navigation based on a GNSS system enters a tunnel where GNSS connection is lost. The mobile device 2 may employ the method according to the first aspect to estimate the vehicle speed based on a detected intensity variation of light emitted from lamps arranged on a ceiling or on side walls of the tunnel and may thus continue navigation. When information indicative of mutual distances between lamps of the tunnel is not yet available as assistance data, the mobile device 2 may on the one hand estimate the mutual distance between the lamps in the tunnel e.g. employing the above described spatial frequency estimating algorithm to employ the method according to the first aspect based on the accordingly estimated spatial frequency. Further, in the latter case, the mobile device 2 may employ the method according to the second aspect and may e.g. provide the estimated spatial frequency to server 3 to be held available at server 3 as assistance data. Based on such collected information indicative of mutual distances between road segments, server 3 may employ the method according to the third aspect to provide the information indicative of mutual distances between road segments to be employed by mobile devices 2 to employ the method according to the first aspect.

Figure 6:
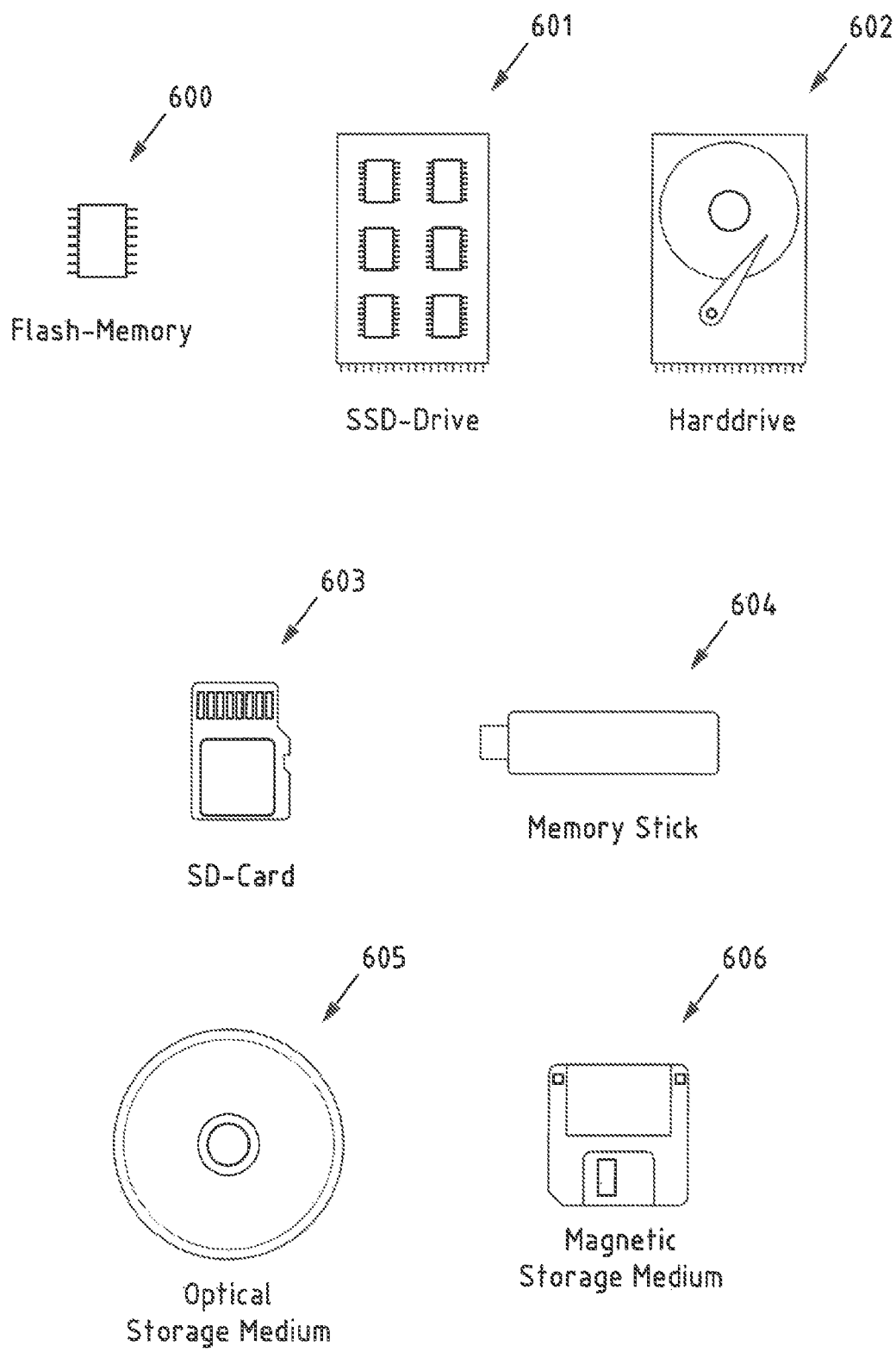
FIG. 6 is a schematic illustration of examples of tangible storage media according to the invention.

FIG. 6 is a schematic illustration of examples of tangible and non-transitory computer-readable storage media according to the present invention that may for instance be used to implement memory 202 of FIG. 2 or memory 302 of FIG. 3. To this end, FIG. 6 displays a flash memory 600, which may for instance be soldered or bonded to a printed circuit board, a solid-state drive 601 comprising a plurality of memory chips (e.g. Flash memory chips), a magnetic hard drive 602, a Secure Digital (SD) card 603, a Universal Serial Bus (USB) memory stick 604, an optical storage medium 605 (such as for instance a CD-ROM or DVD) and a magnetic storage medium 606.

The following example embodiments of the invention are also disclosed:

Embodiment 1

A method comprising:
obtaining or causing obtaining information indicative of a variation in intensity of light emitted from at least two light sources positioned along a segment of a road;
obtaining or causing obtaining information indicative of a velocity of at least one first apparatus and/or of at least one further entity based at least on the information indicative of the variation in intensity.

Embodiment 2

The method according to embodiment 1, the method being performed by the at least one first apparatus, in particular by a mobile device and/or being performed at least one second apparatus, in particular at one or more network servers.

Embodiment 3

The method according to any of embodiments 1 or 2, wherein the at least one further entity is a vehicle, in particular a car or motorcycle, in particular wherein the at least one first apparatus is carried in and/or by the vehicle.

Embodiment 4

The method according to any of embodiments 1 to 3, wherein the velocity is a velocity of the at least one first apparatus and/or of the at least one further entity when moving along at least part of the segment of the road.

Embodiment 5

The method according to any of embodiments 1 to 4, wherein obtaining or causing obtaining information indicative of a variation in intensity of light comprises at least one of the following:
detecting or causing detecting a light intensity
converting or causing converting the detected light intensity into data representative of the variation in intensity of the light;
at least temporary storing or causing at least temporary storing the data representative of the variation in intensity of the light at the at least one first apparatus.

Embodiment 6

The method according to any of the preceding embodiments, wherein detecting comprises employing a light sensor and/or camera of the at least one first apparatus, e.g. of the mobile device.

Embodiment 7

The method according to any of the preceding embodiments, wherein obtaining or causing obtaining information indicative of a velocity of the at least one first apparatus and/or of the at least one further entity comprises at least one of the following:
obtaining or causing obtaining data representative of the velocity of the at least one first apparatus and/or of the at least one further entity;
at least temporary storing or causing at least temporary storing the data representative of the velocity of the at least one first apparatus.

Embodiment 8

The method according to any of the preceding embodiments, further comprising a navigation method for determining a position and/or a velocity of the at least one first apparatus and/or of the at least one further entity, the method comprising at least one of the following:
obtaining or causing obtaining an estimate of a position of the at least one apparatus based on navigation data;
obtaining or causing obtaining navigation data;
relating or causing relating obtained navigation data and/or an estimate of a position of the at least one apparatus obtained based on navigation data to data representative of a map comprising at least the segment of the road.

Embodiment 9

The method according to embodiment 6 wherein the navigation data comprises GNSS navigation data.

Embodiment 10

The method according to any of the preceding embodiments, wherein the at least one apparatus is a mobile device, in particular an Internet-of-Things (IoT) device, a smart home device, a smartphone, a tablet computer, a notebook computer, a smart watch, and a smart band.

Embodiment 11

The method according to any of the preceding embodiments, further comprising:
detecting or causing detecting light emitted from the at least two light sources while moving along at least part of the segment of the road, wherein the information indicative of the variation in intensity comprises a temporal frequency at which the intensity varies at least while moving along the part of the segment.

Embodiment 12

The method according to embodiment 11, further comprising at least one of the following:
monitoring a reception quality of a navigation signal;
triggering or causing triggering the detecting or causing detecting when reception of a navigation signal becomes unavailable or when the reception quality falls below a predefined threshold.

Embodiment 13

The method according to embodiment 12, wherein the navigation signal is a GNSS signal.

Embodiment 14

The method according to any of the preceding embodiments, further comprising:
obtaining or causing obtaining information indicative of a mutual distance between the at least two light sources; and
obtaining or causing obtaining the information indicative of the velocity of the at least one first apparatus and/or of the at least one further entity based on the information indicative of the variation in intensity and the information indicative of the mutual distance.

Embodiment 15

The method according to embodiment 14, wherein the mutual distance comprises or is a mutual distance between a pair of adjacent light sources of the at least two light sources.

Embodiment 16

The method according to any of embodiments 14 or 15, further comprising:
relating or causing relating the obtained information indicative of the mutual distance to information indicative of a map comprising at least the segment of the road held available at the at least one first apparatus.

Embodiment 17

The method according to any of embodiments 14 to 16, wherein the information indicative of the mutual distance between the at least two light sources is related to information indicative of a map comprising at least the segment of the road, the method further comprising:
obtaining or causing obtaining the information indicative of the map in combination with the information indicative of the mutual distance between the at least two light sources from an external apparatus, in particular via a network connection.

Embodiment 18

The method according to any of embodiments 14 to 17, further comprising obtaining or causing obtaining the information indicative of the mutual distance between the at least two light sources from at least one external apparatus.

Embodiment 19

The method according to embodiment 18, wherein the information indicative of the mutual distance between the at least two light sources is obtained from the at least one external apparatus via a network connection.

Embodiment 20

The method according to any of embodiments 14 to 17, further comprising:
providing or causing providing the information indicative of the mutual distance to be held available by at least one external apparatus.

Embodiment 21

The method according to embodiment 14 to 17 and 20, further comprising:
providing or causing providing the information indicative of the mutual distance to be accessible by at least one external apparatus via the network connection.

Embodiment 22

The method according to any of embodiments 14 to 17 and 20 to 21, further comprising:
preparing or causing preparing data representative of the mutual distance between the at least two light sources to be transmittable from the at least one first apparatus to the at least one external apparatus.

Embodiment 23

The method according to any of embodiments 14 to 17 and 20 to 22, further comprising:
transmitting or causing transmitting data representative of the mutual distance between the at least two light sources from the at least one first apparatus to the at least one external apparatus.

Embodiment 24

The method according to any of embodiments 14 to 23, wherein the external apparatus corresponds to or comprises one or more network servers.

Embodiment 25

The method according to any of embodiments 14 to 24, wherein the information indicative of the mutual distance comprises a spatial frequency $F(L_s)$ of a variation of light emitted from the at least two light sources at least along the segment of the road.

Embodiment 26

The method according to any of the preceding embodiments, further comprising at least one of the following:
obtaining or cause obtaining (e.g. estimate or cause estimating at the at least one first apparatus and/or at the at least one second apparatus; and/or receive or cause receiving from at least one second apparatus) a (spatial) frequency $F(L_s)$ of $L_s$ for the segment of the road (e.g. the, the frequency $F(L_s)$ being e.g. defined in cycles per meter;
obtaining or cause obtaining (e.g. estimate or cause estimating at the at least one first apparatus and/or at the at least one second apparatus) a frequency $F(L_d)$ of $L_d$ (e.g. the spatial frequency $F(L_s)$ of embodiment 24) e.g.

when a vehicle moves along the segment of the road, the frequency $F(L_d)$ being e.g. defined in cycles per second;

obtaining or cause obtaining (e.g. estimate or cause estimating at the at least one first apparatus and/or at the at least one second apparatus) a velocity as $$v = \frac{F(L_d)}{F(L_s)}.$$

Embodiment 27

The method according to any of the preceding embodiments, wherein the information indicative of a variation in intensity of light emitted from at least two light sources comprises a spatial frequency $F(L_s)$, the method further comprising one or more of the following:

obtaining or cause obtaining a length l of the segment of the road;

detecting or cause detecting a light intensity signal $L_s$;

estimating or cause estimating an autocorrelation of the detected light intensity signal $L_s$:

$$R_{L_M}(\tau) = \Sigma_{n \in 1 \ldots N} L_M(n) L_M(n-\tau);$$

where N is the total number of samples in $L_s$;

estimating or cause estimating a number $t_C$ of signal samples of the detected signal in one cycle as:

$$t_C = \underset{\tau}{\mathrm{argmax}}\, R_{L_M};$$

estimating or cause estimating a number of cycles $N_C^S$ of $L_s$ at the road segment as:

$$N_C^S = \frac{N}{t_C};$$

and estimating or cause estimating the frequency $F(L_s)$ (e.g. in cycles per meter) as $$F(L_s) = \frac{N_C^S}{l}.$$

Embodiment 28

The method according to any of the preceding embodiments, further comprising at least one of the following:

determining or causing determining an absolute velocity of the at least one first apparatus and/or the at least one further entity, wherein the absolute velocity corresponds to the information indicative of the velocity of the at least one first apparatus and/or the at least one further entity;

obtaining or causing obtaining an initial velocity of the at least one first apparatus at a first part of the segment of the road and estimating or causing estimating a relative change of velocity of the at least one first apparatus and/or the at least one further entity at a second part of the segment of the road based on the initial velocity and the information indicative of the variation in intensity.

Embodiment 29

The method according to embodiment 28, further comprising:

obtaining or causing obtaining information indicative of a velocity of the at least one first apparatus and/or the at least one further entity when moving along a prior segment of the road adjacent and prior to the segment of the road as the initial velocity.

Embodiment 30

The method according to any of the embodiments 28 or 29, wherein the road segment is a segment inside of a tunnel, the method further comprising:

obtaining or causing obtaining information indicative of a velocity of the at least one first apparatus and/or the at least one further entity when entering the tunnel as the initial velocity.

Embodiment 31

The method according to any of the embodiments 26 to 28, further comprising: obtaining or causing obtaining the initial velocity based on navigation (e.g. GNSS) signals.

Embodiment 32

A method performed by at least one first apparatus said method comprising:

obtaining or causing obtaining information indicative of a variation in intensity of light emitted from at least two light sources positioned along a segment of a road;

obtaining or causing obtaining information indicative of a mutual distance between the at least two light sources;

providing or causing providing the information indicative of the mutual distance to be accessible (e.g. receivable) by at least one external apparatus.

Embodiment 33

The method according to embodiment 32 being a navigation method for determining a position and/or a velocity of the at least one first apparatus, the method comprising at least one of the following:

obtaining or causing obtaining an estimate of a position of the at least one apparatus based on navigation data;

obtaining or causing obtaining navigation data;

relating or causing relating obtained navigation data and/or an estimate of a position of the at least one apparatus obtained based on navigation data to data representative of a map comprising at least the segment of the road.

Embodiment 34

The method according to any of the embodiments 32 or 33, further comprising:

obtaining or causing obtaining information indicative of a length of the segment of the road; and estimating or causing estimating the information indicative of the mutual distance between the at least two light sources based at least on the information indicative of the length of the segment of the road.

Embodiment 35

The method according to any of the embodiments 32 to 34, wherein the information indicative of a variation in intensity of light emitted from at least two light sources comprises a spatial frequency WA the method further comprising one or more of the following:
obtaining or cause obtaining a length l of the segment of the road;
detecting or cause detecting a light intensity signal $L_s$;
estimating or cause estimating an autocorrelation of the detected light intensity signal $L_s$:

$$R_{L_M}(\tau) = \Sigma_{n \in 1 \ldots N} L_M(n) L_M(n-\tau);$$

where N is the total number of samples in $L_s$;
estimating or cause estimating a number $t_C$ of signal samples of the detected signal in one cycle as:

$$t_C = \underset{\tau}{\mathrm{argmax}}\, R_{L_M};$$

estimating or cause estimating a number of cycles $N_C^S$ of $L_s$ at the road segment as:

$$N_C^S = \frac{N}{t_C},$$

and
estimating or cause estimating the frequency $F(L_s)$ (e.g. in cycles per meter) as $$F(L_s) = \frac{N_C^S}{l}.$$

Embodiment 36

The method according to any of embodiments 32 to 35, further comprising:
preparing or causing preparing data representative of the mutual distance between the at least two light sources to be transmittable from the at least one first apparatus to the at least one external apparatus.

Embodiment 37

The method according to any of embodiments 32 to 36, further comprising:
transmitting or causing transmitting data representative of the mutual distance between the at least two light sources from the at least one first apparatus to the at least one external apparatus.

Embodiment 38

A method performed by at least one second apparatus said method comprising:
accessing or causing accessing (e.g. receiving or causing receiving) information indicative of a mutual distance between at least two light sources positioned along at least one respective segment of a road;
holding or causing holding available the information indicative of the mutual distance;
providing or causing providing the information indicative of the mutual distance to be accessible by at least one external apparatus.

Embodiment 39

The method according to embodiment 38, further comprising:
receiving or causing receiving the information indicative of the mutual distance between the at least two light sources.

Embodiment 40

The method according to any of embodiments 38 or 39, further comprising:
receiving or causing receiving the information indicative of the mutual distance between the at least two light sources from at least one external apparatus, e.g. from a mobile device, e.g. via the network connection.

Embodiment 42

The method according to any of embodiments 38 to 40, wherein the at least one second apparatus is or comprises one or more network servers such as for example one or more components of a server cloud.

Embodiment 42

The method according to any of embodiments 38 to 41, further comprising:
receiving or causing receiving information indicative of a mutual distance between at least two light sources positioned along at least one respective segment of a road from at least one external device, e.g. from at least one mobile device.

Embodiment 43

The method according to any of embodiments 38 to 42, further comprising:
holding or causing holding available information indicative of a plurality of mutual distances between pairs of light sources positioned along respective road segments; receiving a request for information indicative of a mutual distance between pairs of light sources positioned along a specific road segment;
providing or causing providing the information indicative of the mutual distance between pairs of light sources positioned along the specific road segment to be accessible by an external apparatus.

Embodiment 44

The method according to any of embodiments 1 to 43, not comprising a communication method based on information encoded into visible light signals.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following: (a) hardware-only circuit implementations (such as implementations in only analog and/or digital circuitry)

(b) combinations of circuits and software (and/or firmware), such as: (1) to a combination of processor(s) or (2) to sections of processor(s)/software (including digital signal processor(s)), software, and memory(ies) that work together to cause an apparatus, such as a mobile device, to perform various functions) and (c) to circuits, such as a microprocessor(s) or a section of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions or steps described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording "A, or B, or C, or a combination thereof" or "at least one of A, B and C" may be understood to be not exhaustive and to include at least the following: (1) A, or (2) B, or (3) C, or (4) A and B, or (5) A and C, or (6) B and C, or (7) A and B and C.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

That which is claimed is:

1. A method comprising:
    obtaining light intensity information that is indicative of an intensity of light emitted from at least two light sources positioned along a segment of a road and detected by a light sensor;
    converting the light intensity information into data representative of a variation in the intensity of light;
    detecting light emitted from the at least two light sources while moving along at least part of the segment of the road, wherein the data representative of the variation in the intensity of light comprises a temporal frequency at which the intensity varies at least while moving along the part of the segment;
    obtaining information indicative of a mutual distance between the at least two light sources wherein the mutual distance is based on at least information indicative of a length of the segment of the road; and
    obtaining information indicative of a velocity of at least one first apparatus and/or of at least one further entity based at least on the data representative of the variation in the intensity of light.

2. The method according to claim 1 further comprising a navigation method for determining a position and/or a velocity of the at least one first apparatus and/or of the at least one further entity, the navigation method comprising at least one of the following:
    obtaining an estimate of a position of the at least one first apparatus and/or of the at least one further entity based on navigation data;
    obtaining navigation data; and/or
    relating obtained navigation data and/or an estimate of a position of the at least one first apparatus and/or of the at least one further entity based on relating the navigation data to data representative of a map comprising at least the segment of the road.

3. The method according to claim 1, further comprising:
    obtaining the information indicative of the velocity of the at least one first apparatus based on the data representative of the variation in the intensity of light and the information indicative of the mutual distance.

4. The method according to claim 1, wherein the information indicative of the mutual distance comprises a spatial frequency of a variation of light emitted from the at least two light sources at least along the segment of the road.

5. The method according to claim 3, further comprising:
    obtaining the information indicative of the mutual distance between the at least two light sources from at least one external apparatus.

6. The method according to claim 1 comprising at least one of the following:
    determining an absolute velocity of the at least one first apparatus and/or of the at least one further entity, wherein the absolute velocity corresponds to the information indicative of the velocity of the at least one first apparatus and/or of the at least one further entity; and/or
    obtaining an initial velocity of the at least one first apparatus and/or of the at least one further entity at a first part of the segment of the road and estimating a relative change of velocity of the at least one first apparatus and/or of the at least one further entity at a second part of the segment of the road based on the initial velocity and the data representative of the variation in the intensity of light.

7. A method performed by at least one first apparatus, said method comprising:
    obtaining light intensity information that is indicative of an intensity of light emitted from at least two light sources positioned along a segment of a road and detected by a light sensor;
    converting the light intensity information into data representative of a variation in the intensity of light;
    obtaining information indicative of a length of the segment of the road; and estimating information indicative of a mutual distance between the at least two light sources based on at least the information indicative of the length of the segment of the road.

8. The method according to claim 7, wherein the data representative of the variation in the intensity of light emitted from at least two light sources comprises a spatial frequency $F(L_s)$, the method further comprising one or more of the following:
obtaining a length l of the segment of the road;
detecting a light intensity signal $L_s$;
estimating an autocorrelation of the detected light intensity signal $L_s$:

$$R_{L_M}(\tau)=\Sigma_{n\in 1 \ldots N}L_M(n)L_M(n-\tau);$$

where N is the total number of samples in $L_s$;
estimating a number $t_C$ of signal samples of the detected signal in one cycle as:

$$t_C = \underset{\tau}{\mathrm{argmax}}\, R_{L_M};$$

estimating a number of cycles $N_C^S L_S$ at the road segment as:

$$N_C^S = \frac{N}{t_C},$$

and
estimating the frequency $F(L_s)$ (e.g. in cycles per meter) as $$F(L_s) = \frac{N_C^S}{l}.$$

9. An apparatus comprising at least one processor and at least one memory that contains program code, wherein the at least one memory and the program code are configured to use the at least one processor to cause the apparatus to perform and/or control at least:
obtaining light intensity information that is indicative of an intensity of light emitted from at least two light sources positioned along a segment of a road and detected by a light sensor;
converting the light intensity information into data representative of the variation in the intensity of light;
detecting light emitted from the at least two light sources while moving along at least part of the segment of the road, wherein the data representative of the variation in the intensity of light comprises a temporal frequency at which the intensity varies at least while moving along the part of the segment;
obtaining information indicative of a mutual distance between the at least two light sources wherein the mutual distance is based on at least information indicative of a length of the segment of the road; and
obtaining information indicative of a velocity of at least one first apparatus and/or of at least one further entity based at least on the data representative of the variation in the intensity of light.

10. The apparatus according to claim 9 wherein the at least one memory and the program code are further configured to use the at least one processor to cause the apparatus to perform and/or control at least one of the following:
obtaining an estimate of a position of the at least one first apparatus and/or of the at least one further entity based on navigation data;
obtaining navigation data; and/or
relating obtained navigation data and/or an estimate of a position of the at least one first apparatus and/or of the at least one further entity based on relating the navigation data to data representative of a map comprising at least the segment of the road.

11. The apparatus according to claim 9, wherein the at least one memory and the program code are further configured to use the at least one processor to cause the apparatus to perform and/or control at least:
obtaining the information indicative of the velocity of the at least one first apparatus based on the data representative of the variation in the intensity of light and the information indicative of the mutual distance.

12. The apparatus according to claim 9, wherein the information indicative of the mutual distance comprises a spatial frequency of a variation of light emitted from the at least two light sources at least along the segment of the road.

13. The apparatus according to claim 9, wherein the at least one memory and the program code are further configured to use the at least one processor to cause the apparatus to perform and/or control at least:
obtaining the information indicative of the mutual distance between the at least two light sources from at least one external apparatus.

14. The apparatus according to claim 9 wherein the at least one memory and the program code are further configured to use the at least one processor to cause the apparatus to perform and/or control at least one of the following:
determining an absolute velocity of the at least one first apparatus and/or of the at least one further entity, wherein the absolute velocity corresponds to the information indicative of the velocity of the at least one first apparatus and/or of the at least one further entity; and/or
obtaining an initial velocity of the at least one first apparatus and/or of the at least one further entity at a first part of the segment of the road and estimating a relative change of velocity of the at least one first apparatus and/or of the at least one further entity at a second part of the segment of the road based on the initial velocity and the data representative of the variation in the intensity of light.

15. The apparatus according to claim 9, wherein the at least one memory and the program code are further configured to use the at least one processor to cause the apparatus to perform and/or control at least:
estimating new information indicative of the mutual distance between the at least two light sources based at least on the information indicative of the length of the segment of the road.

16. The apparatus according to claim 9, wherein the data representative of the variation in the intensity of light emitted from at least two light sources comprises a spatial frequency F(Ls), and wherein the at least one memory and the program code are further configured to use the at least one processor to cause the apparatus to perform and/or control at least one or more of the following:

obtaining a length/of the segment of the road;
detecting a light intensity signal Ls;
estimating an autocorrelation of the detected light intensity signal $L_s$:

$$R_{L_M}(\tau) = \Sigma_{n \in 1 \ldots N} L_M(n) L_M(n-\tau);$$

where N is the total number of samples in $L_s$;
estimating a number $t_C$ of signal samples of the detected signal in one cycle as:

$$t_C = \underset{\tau}{\operatorname{argmax}} R_{L_M};$$

estimating a number of cycles $N_C^S L_s$ at the road segment as:

$$N_C^S = \frac{N}{t_C},$$

and estimating the frequency $F(L_s)$ (e.g. in cycles per meter) as $$F(L_s) = \frac{N_C^S}{l}.$$

17. The method according to claim 7, further comprising:
providing the data representative of the variation in the intensity of light so as to be accessible by at least one external apparatus; and
providing the information indicative of the mutual distance so as to be accessible by the at least one external apparatus.

18. The apparatus according to claim 15 wherein the at least one memory and the program code are further configured to use the at least one processor to cause the apparatus to perform and/or control at least:
providing the new information indicative of the mutual distance so as to be accessible by at least one external apparatus.

* * * * *